(12) United States Patent
Zhou et al.

(10) Patent No.: US 12,581,437 B2
(45) Date of Patent: Mar. 17, 2026

(54) DATA TRANSMISSION METHOD AND DEVICE

(71) Applicant: DATANG MOBILE COMMUNICATIONS EQUIPMENT CO., LTD., Beijing (CN)

(72) Inventors: Lei Zhou, Beijing (CN); Yanping Xing, Beijing (CN); Jinhua Miao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 399 days.

(21) Appl. No.: 18/255,126

(22) PCT Filed: Nov. 26, 2021

(86) PCT No.: PCT/CN2021/133442
§ 371 (c)(1),
(2) Date: May 31, 2023

(87) PCT Pub. No.: WO2022/121704
PCT Pub. Date: Jun. 16, 2022

(65) Prior Publication Data
US 2024/0031956 A1      Jan. 25, 2024

(30) Foreign Application Priority Data

Dec. 11, 2020     (CN) .......................... 202011458790.X

(51) Int. Cl.
H04W 56/00          (2009.01)
(52) U.S. Cl.
CPC ............................... H04W 56/0015 (2013.01)

(58) Field of Classification Search
CPC . H04W 12/06; H04W 12/08; H04W 56/0015; H04W 72/115; H04W 56/001; H04W 72/1221
USPC ......................................................... 370/329
See application file for complete search history.

(56) References Cited

U.S. PATENT DOCUMENTS

| | | | | |
|---|---|---|---|---|
| 12,284,617 | B2 * | 4/2025 | Tsai ................... | H04B 7/06964 |
| 2020/0260417 | A1 | 8/2020 | Jo et al. | |
| 2021/0136831 | A1 | 5/2021 | Zhang et al. | |
| 2022/0022247 | A1 * | 1/2022 | Agiwal ............. | H04W 72/0453 |
| 2022/0046661 | A1 * | 2/2022 | Jeon ...................... | H04W 72/23 |

(Continued)

FOREIGN PATENT DOCUMENTS

| | | |
|---|---|---|
| CN | 110769505 | 2/2020 |
| CN | 111148262 | 5/2020 |

(Continued)

OTHER PUBLICATIONS

3GPP TSG-RAN WG2 Meeting #112e, "Discussion on CG based NR small data transmission," Nov. 2-13, 2020.

(Continued)

*Primary Examiner* — Robert J Lopata
(74) *Attorney, Agent, or Firm* — Harness, Dickey & Pierce, P.L.C.

(57)                ABSTRACT

The present disclosure discloses a data transmission method and device. The method includes: determining, by a terminal in a disconnected state, a target CGO corresponding to a target SSB according to a matching relationship between the SSB and the CGO; sending, by the terminal, uplink data on the target CGO.

17 Claims, 14 Drawing Sheets

(56)                    References Cited

U.S. PATENT DOCUMENTS

| | | | |
|---|---|---|---|
| 2022/0086916 A1 | 3/2022 | Chen et al. | |
| 2022/0124780 A1* | 4/2022 | Lei ........................ | H04L 5/0053 |
| 2022/0132594 A1 | 4/2022 | Ren | |
| 2022/0210798 A1* | 6/2022 | Tsai .................. | H04W 72/1263 |
| 2022/0322446 A1* | 10/2022 | Vangala ............ | H04W 28/0278 |
| 2023/0144750 A1* | 5/2023 | Agiwal ................ | H04W 48/14 |
| | | | 455/422.1 |
| 2023/0328670 A1* | 10/2023 | Miao ................ | H04W 72/1268 |
| | | | 370/503 |

FOREIGN PATENT DOCUMENTS

| | | |
|---|---|---|
| CN | 111278160 | 6/2020 |
| CN | 111565471 | 8/2020 |
| WO | WO-2020093964 | 5/2020 |

OTHER PUBLICATIONS

3GPP TSG-RAN WG2 #112-e, "CG-based SDT," Nov. 2-13, 2020.
Chinese Office Action and English translation thereof for Chinese Application No. 202011458790 mailed Jun. 10, 2023.
International Search Report and Written Opinion and English translation thereof for PCT/CN2021/133442 mailed Feb. 10, 2022.
Extended European Search report issued May 10, 2024 in European Application No. 21902411.4.
Samsung, "Configured Grant based Small Data Transmission," 3GPP TSG RAN2 Meeting #112, R2-2009094, Oct. 23, 2020.
CATT, "Analysis on SDT Procedures using CG," 3GPP TSG-RAN WG2 Meeting #112, R2-2009369, Oct. 23, 2020.

* cited by examiner network device

11 terminal

| determining, by a terminal in a disconnected state, a target CGO corresponding to a target SSB according to a matching relationship between the SSB and the CGO | 81 |

| sending, by the terminal, uplink data on the target CGO | 82 |

1101 processor 1102 transceiver 1103 memory bus interface user interface

1104 determining unit    121 receiving unit    122

1301 processor 1302 transceiver 1303 memory bus interface

DATA TRANSMISSION METHOD AND DEVICE

CROSS-REFERENCE TO RELATED APPLICATIONS

This application is the U.S. national phase of PCT Application No. PCT/CN2021/133442 filed on Nov. 26, 2021, which claims priority to Chinese patent application No. 202011458790.X filed on Dec. 11, 2020, both of which are incorporated herein by reference in their entireties.

TECHNICAL FIELD

The present disclosure relates to the field of wireless communication technology, in particular to a data transmission method and device.

BACKGROUND

In the fifth-generation mobile communication system (5G) new radio (NR) technology, the configured grant (CG) scheduling transmission mechanism is similar to the semi-static scheduling in the long-term evolution (LTE). The CG scheduling transmission mechanism is mainly used for uplink transmission. The base station (gNB) pre-configures uplink Physical Uplink Shared Channel (PUSCH) resources and the terminal (UE) does not need to send uplink Scheduling Request (SR) to the base station if the UE needs to send uplink data, the data can be sent directly on the resource scheduled by the CG.

The CG scheduling transmission mechanism is usually that the base station (gNB) activates an uplink grant to the UE, under the condition that the UE does not receive the deactivation message, the UE will always use the resources specified by the first uplink grant for uplink transmission. There are two transmission types:

CG type 1 (type 1): configured by radio resource control (RRC) through high-layer signaling (IE ConfiguredGrantConfig);

CG type 2 (type 2): the downlink control information (DCI) indicates the activation and deactivation of uplink grant free, and the required parameters are configured by the information element (IE) ConfiguredGrantConfig, but it is only used when activated by DCI.

CG type 1 and type 2 are distinguished according to the field rrc-ConfiguredUplinkGrant in IE ConfiguredGrantConfig. If this field is configured, it is CG type 1. If this field is not configured, it is CG type 2.

At present, the CG scheduling transmission mechanism is mainly applicable to the UE in the connection mode.

SUMMARY

The present disclosure aims to provide a data transmission method and device, so as to realize the data transmission of the terminal in a disconnected state based on the CG mechanism.

In a first aspect, an embodiment of the present disclosure provides a data transmission method including: determining, by a terminal in a disconnected state, a target configured grant occasion (CGO) corresponding to a target Synchronization Signal and PBCH block (SSB) according to a matching relationship between the SSB and the CGO; sending, by the terminal, uplink data on the target CGO.

In an embodiment of the present disclosure, before determining a target CGO corresponding to a target SSB, the method further includes: determining, by the terminal, the matching relationship between the SSB and CGO according to configuration of a base station; or, obtaining, by the terminal, the matching relationship between the SSB and CGO through calculation, wherein the matching relationship is valid in at least one matching period, and the matching period is preconfigured or pre-agreed.

In an embodiment of the present disclosure, the determining a target CGO corresponding to a target SSB includes: determining a serial number of each CGO in the matching period; determining a serial number of the target CGO corresponding to the target SSB according to a matching relationship between an SSB serial number and a CGO serial number.

In an embodiment of the present disclosure, the determining a serial number of each CGO in the matching period includes: determining the serial number of each CGO in the matching period according to one of the following numbering rules: numbering rule 1: numbering according to an order of a time domain first and then a frequency domain, determining the serial number of each CGO in the matching period; numbering rule 2: numbering according to an order of the frequency domain first and then the time domain, determining the serial number of each CGO in the matching period; numbering rule 3: in each slot in the matching period, numbering in the order of the time domain first and then the frequency domain, and numbering in a chronological order between slots in the matching period; or, in each slot in the matching period, numbering in the order of the frequency domain first and then the time domain, and numbering in the chronological order between the slots in the matching period.

In an embodiment of the present disclosure, the determining the serial number of each CGO in the matching period further includes: in the case of CGOs overlapping in time domains with different starting OFDM symbols, performing numbering in an order from a nearest time to a farthest time corresponding to the starting OFDM of each CGO; in the case of CGOs overlapping in frequency domains with different starting OFDM symbols, performing numbering in an ascending order of a smallest PRB serial number in each CGO.

In an embodiment of the present disclosure, before determining the serial number of each CGO in the matching period, the method further includes: determining whether the CGO of each slot is valid according a slot configuration, wherein, when the slot configuration is UL, a CGO of the slot configuration is valid; when the slot configuration is DL, the CGO of the slot configuration is invalid; when the slot configuration is flexible, the CGO of the slot configuration is determined to be valid or invalid.

In an embodiment of the present disclosure, the obtaining, by the terminal, the matching relationship between the SSB and the CGO through calculation, includes: when a total number $CGO_{total}$ of CGOs in the matching period is greater than a total number $SSB_{total}$ of SSBs, calculating a value of K1 according to $K1=\lfloor CGO_{total}/SSB_{total}\rfloor$; starting from the CGO with the smallest serial number in the matching period, sequentially matching each consecutive K1 CGOs with one SSB in the SSBs, or dividing the CGOs in the matching period into K1 groups, each CGO group containing $SSB_{total}$ CGOs, and sequentially matching one CGO in each CGO group with the one SSB in the SSBs; when $CGO_{total}$ is not greater than $SSB_{total}$, calculating a value of K2 according to $K2=\lfloor SSB_{total}/CGO_{total}\rfloor$; starting from the SSB with the smallest serial number, sequentially matching each K2 SSBs with one CGO in the matching period, or, dividing the SSBs into K2 groups, each SSB group containing $CGO_{total}$ SSBs, and sequentially matching one SSB in each SSB group with one CGO in the matching period.

In an embodiment of the present disclosure, the determining, by the terminal, the matching relationship between the SSB and the CGO according to configuration of the base station, includes: when a matching ratio R of SSB and CGO configured by the base station is an integer greater than 1, starting from the SSB with the smallest serial number, sequentially matching every R SSBs with one CGO in the matching period, or, dividing the SSBs into R groups, and each SSB group containing the total number of CGO SSBs, and sequentially matching one SSB in each SSB group with one CGO in the matching period; when the matching ratio R of SSB and CGO configured by the base station is not greater than 1, and 1/R is an integer, starting from the CGO with the smallest serial number in the matching period, sequentially matching each consecutive 1/R CGOs with one SSB in the SSBs, or dividing the CGOs in the matching period into 1/R groups, each CGO group containing a total number of SSB CGOs, and sequentially matching one CGO in each CGO group with one SSB in the SSBs.

In an embodiment of the present disclosure, when the CG is configured as repeated transmission: in the matching relationship, M transmission occasions TO in one CGO being used as one repetition bundle corresponding to one or more SSBs; or, N CGOs being used as one repetition bundle corresponding to one or more SSBs, wherein each of the N CGOs includes one TO, and the N is less than or equal to the maximum number of CGOs in the matching period, a serial number of a starting CGO of the repetition bundle being an integer multiple of N.

In an embodiment of the present disclosure, the CGO is configured on a BWP other than an initial BWP.

In an embodiment of the present disclosure, when a single user supports multiple sets of CG configurations, each set of CG configurations independently sets the matching relationship with the SSB, or multiple sets of CGs set a same matching relationship with the SSB.

In a second aspect, an embodiment of the present disclosure provides a data transmission method, including: determining, by a base station, a CGO corresponding to each SSB according to a matching relationship between the SSB and the CGO; receiving, by the base station, data sent by a terminal in a disconnected state on the CGO corresponding to the SSB using a beam corresponding to the SSB.

In an embodiment of the present disclosure, the matching relationship between the SSB and the CGO is determined by the base station according to configuration, or is obtained by the base station through calculation, wherein the matching relationship is valid in at least one matching period, and the matching period is preconfigured or pre-agreed.

In an embodiment of the present disclosure, the method further includes: sending a configuration signaling to the terminal to configure the matching relationship between the SSB and the CGO.

In an embodiment of the present disclosure, the determining the CGO corresponding to each SSB includes: determining a serial number of each CGO in the matching period; determining a serial number of a CGO corresponding to each SSB according to a matching relationship between a SSB serial number and a CGO serial number.

In an embodiment of the present disclosure, the determining the serial number of each CGO in the matching period includes: determining the serial number of each CGO in the matching period according to one of the following numbering rules: numbering rule 1: numbering according to an order of a time domain first and then a frequency domain, determining the serial number of each CGO in the matching period; numbering rule 2: numbering according to an order of the frequency domain first and then the time domain, determining the serial number of each CGO in the matching period; numbering rule 3: in each slot in the matching period, numbering in the order of the time domain first and then the frequency domain, and numbering in a chronological order between slots in the matching period; or, in each slot in the matching period, numbering in the order of the frequency domain first and then the time domain, and numbering in the chronological order between the slots in the matching period.

In an embodiment of the present disclosure, the determining the serial number of each CGO in the matching period further includes: in the case of CGOs overlapping in time domains with different starting OFDM symbols, performing numbering in an order from a nearest time to a farthest time corresponding to the starting OFDM of each CGO; in the case of CGOs overlapping in frequency domains with different starting OFDM symbols, performing numbering in an ascending order of a smallest PRB serial number in each CGO.

In an embodiment of the present disclosure, before determining the serial number of each CGO in the matching period, the method further includes: determining whether the CGO of each slot is valid according a slot configuration, wherein, when the slot configuration is UL, a CGO of the slot configuration is valid; when the slot configuration is DL, the CGO of the slot configuration is invalid; when the slot configuration is flexible, the CGO of the slot configuration is determined to be valid or invalid.

In an embodiment of the present disclosure, the matching relationship between the SSB and CGO is calculated in the following method: when a total number $CGO_{total}$ of CGOs in the matching period is greater than a total number $SSB_{total}$ of SSBs, calculating a value of K1 according to $K1=\lfloor CGO_{total}/SSB_{total} \rfloor$; starting from the CGO with the smallest serial number in the matching period, sequentially matching each consecutive K1 CGOs with one SSB in the SSBs, or dividing the CGOs in the matching period into K1 groups, each CGO group containing $SSB_{total}$ CGOs, and sequentially matching one CGO in each CGO group with the one SSB in the SSBs; when $CGO_{total}$ is not greater than $SSB_{total}$, calculating a value of K2 according to $K2=\lfloor SSB_{total}/CGO_{total} \rfloor$; starting from the SSB with the smallest serial number, sequentially matching each K2 SSBs with one CGO in the matching period, or, dividing the SSBs into K2 groups, each SSB group containing $CGO_{total}$ SSBs, and sequentially matching one SSB in each SSB group with one CGO in the matching period.

In an embodiment of the present disclosure, the matching relationship between the SSB and the CGO is determined in the following method: when a matching ratio R of SSB and CGO configured by the base station is an integer greater than 1, starting from the SSB with the smallest serial number, sequentially matching every R SSBs with one CGO in the matching period, or, dividing the SSBs into R groups, and each SSB group containing the total number of CGO SSBs, and sequentially matching one SSB in each SSB group with one CGO in the matching period; when the matching ratio R of SSB and CGO configured by the base station is not greater than 1, and 1/R is an integer, starting from the CGO with the smallest serial number in the matching period, sequentially matching each consecutive 1/R CGOs with one SSB in the SSBs, or dividing the CGOs in the matching period into 1/R groups, each CGO group containing a total number of SSB CGOs, and sequentially matching one CGO in each CGO group with one SSB in the SSBs.

In an embodiment of the present disclosure, when the CG is configured as repeated transmission: in the matching relationship, M transmission occasions TO in one CGO being used as one repetition bundle corresponding to one or more SSBs; or, N CGOs being used as one repetition bundle corresponding to one or more SSBs, wherein each of the N CGOs includes one TO, and the N is less than or equal to the maximum number of CGOs in the matching period, a serial number of a starting CGO of the repetition bundle being an integer multiple of N.

In an embodiment of the present disclosure, the CGO is configured on a BWP other than the initial BWP.

In an embodiment of the present disclosure, when a single user supports multiple sets of CG configurations, each set of CG configurations independently sets the matching relationship with SSB, or multiple sets of CGs set a same matching relationship with SSB.

In a third aspect, an embodiment of the present disclosure provides a terminal, comprising a memory, a transceiver and a processor, wherein, the memory is used to store computer programs; the transceiver is used to send and receive data under the control of the processor; the processor is configured to read the computer program in the memory and perform the following operations: when the terminal is in a disconnected state, determining a target configured grant occasion (CGO) corresponding to a target Synchronization Signal and PBCH block (SSB) according to a matching relationship between the SSB and the CGO; sending uplink data on the target CGO.

In a fourth aspect, an embodiment of the present disclosure provides a terminal, including: a determination unit, configured to determine a target configured grant occasion (CGO) corresponding to a target Synchronization Signal and PBCH block (SSB) according to a matching relationship between the SSB and the CGO when the terminal is in a disconnected state; a sending unit, configured to send uplink data on the target CGO.

In a fifth aspect, an embodiment of the present disclosure provides a base station, comprising a memory, a transceiver, and a processor, wherein, the memory is used to store computer programs; the transceiver is used to send and receive data under the control of the processor; the processor is configured to read the computer program in the memory and perform the following operations: determining a CGO corresponding to each SSB according to a matching relationship between the SSB and the CGO; receiving data sent by a terminal in a disconnected state on the CGO corresponding to the SSB using a beam corresponding to the SSB.

In a sixth aspect, an embodiment of the present disclosure provides a base station, including: a determination unit, configured to determine a CGO corresponding to each SSB according to a matching relationship between the SSB and the CGO; a receiving unit, configured to receive data sent by a terminal in a disconnected state on the CGO corresponding to the SSB using a beam corresponding to the SSB.

In a seventh aspect, an embodiment of the present disclosure provides a processor-readable storage medium, storing a computer program, and when the computer program is executed by the processor to perform the data transmission method.

As compared with the related art, in the data transmission method and device provided by the present embodiment, by associating the SSB with the CGO, the base station can use the beam corresponding to the SSB to receive the uplink data sent by the terminal. In the embodiments of the present disclosure, the SSB-based CG mechanism can better support small data transmission in the disconnected state, thereby saving terminal power consumption and reducing network overhead caused by frequent access to the network.

BRIEF DESCRIPTION OF THE DRAWINGS

Various other advantages and benefits will become apparent to those of ordinary skill in the art when reading the following detailed description of the embodiments. The drawings are only for purposes of illustrating the embodiments and are not to be considered to limit the present disclosure. The same reference numbers are used to designate the same components throughout the drawings

DETAILED DESCRIPTION

Figure 1:
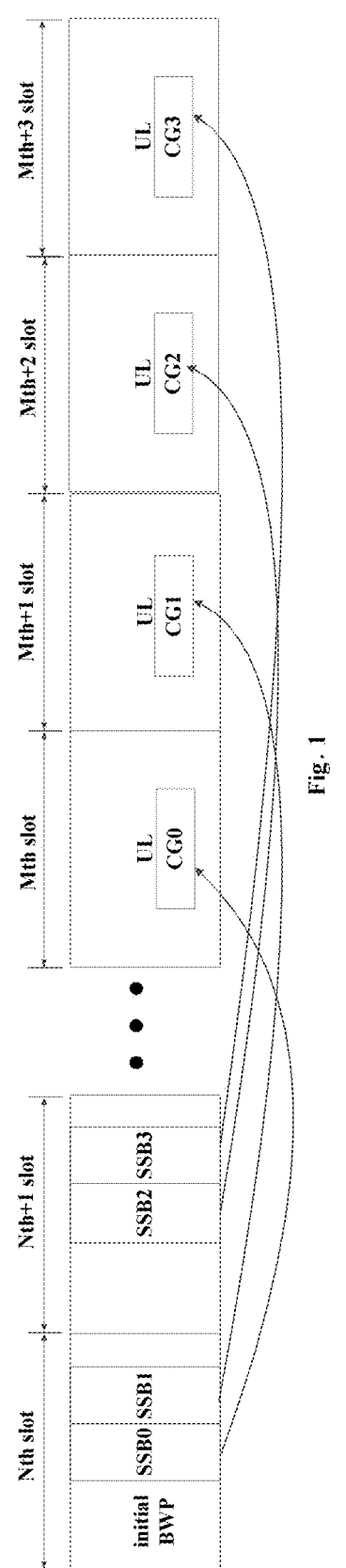
FIG. 1 is a schematic diagram showing a matching relationship between SSB and CGO according to at least one embodiment of the present disclosure.

Embodiments of the present disclosure will be described in more detail below with reference to the accompanying drawings. Although embodiments of the present disclosure are shown in the drawings, it should be understood that the present disclosure may be embodied in various forms and should not be limited by the embodiments set forth herein. Rather, these embodiments are provided for more thorough understanding of the present disclosure and to fully convey the scope of the present disclosure to those skilled in the art.

The terms "first", "second" and the like in the specification and claims of the present application are used to distinguish similar objects, and are not necessarily used to describe a specific order or sequence. It is to be understood that the data are interchangeable under appropriate circumstances such that the embodiments of the present disclosure can be practiced in sequences other than those illustrated or described herein. Furthermore, the terms "comprisingi" and "having", as well as any variations thereof, are intended to cover a non-exclusive inclusion, for example, a process, method, system, product or device comprising a sequence of steps or elements is not necessarily limited to the expressly listed, instead, may include other steps or elements not explicitly listed or inherent to the process, method, product or device. "And/or" in the specification and claims means at least one of the connected objects.

The techniques described herein are not limited to NR systems and Long Time Evolution (LTE)/LTE-Advanced (LTE-A) systems, and can also be used in various wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" are often used interchangeably. A CDMA system may implement radio technologies such as CDMA2000, Universal Terrestrial Radio Access (UTRA), and the like. UTRA includes Wideband Code Division Multiple Access (WCDMA) and other CDMA variants. A TDMA system implements a radio technology such as Global System for Mobile Communication (GSM). The OFDMA system can implement radio technologies such as UltraMobile Broadband (UMB), Evolution-UTRA (Evolution-UTRA, E-UTRA), IEEE 802.21 (Wi-Fi), IEEE 802.16 (WiMAX), IEEE 802.20, Flash-OFDM, etc. UTRA and E-UTRA are parts of the Universal Mobile Telecommunications System (UMTS). LTE and LTE-Advanced (like LTE-A) are new UMTS versions that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. However, the following description describes NR systems for example, and NR terminology is used in most of the following description, although the techniques are applicable to applications other than NR system applications as well.

The following description provides examples and does not limit the scope, applicability or configuration set forth in the claims. Changes may be made in the function and arrangement of elements discussed without departing from the spirit and scope of the disclosure. Various examples may omit, substitute, or add various procedures or components as appropriate. For example, the methods may be performed in an order different from that described, and various steps may be added, omitted, or combined. Additionally, features described with reference to certain examples may be combined in other examples.

Figure 7:
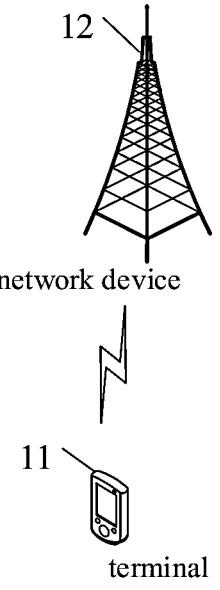
FIG. 7 is a schematic diagram showing an application system of the data transmission method according to at least one embodiment of the present disclosure.

FIG. 7 shows a block diagram of a wireless communication system to which an embodiment of the present disclosure is applicable. The wireless communication system includes a terminal 11 and a network device 12. Wherein, the terminal 11 may also be called a user terminal or user equipment (UE), and the terminal 11 may be a mobile phone, a tablet computer, a laptop computer, a personal digital assistant (PDA), mobile Internet device (MID), wearable device or vehicle-mounted equipment and other terminal-side devices. It should be noted that the specific type of terminal 11 is not limited in the embodiments of the present disclosure. The network device 12 can be a base station and/or a core network element, wherein the above-mentioned base station can be a base station of 5G and later versions (for example: gNB, 5G NR NB, etc.), or a base station in other communication systems (for example: eNB, WLAN access point, or other access point, etc.), where a base station may be referred to as Node B, evolved Node B, access point, base transceiver station (BTS), radio base station, radio transceiver, Basic Service Set (BSS), Extended Service Set (ESS), Node B, Evolved Node B (eNB), Home Node B, Home Evolved Node B, WLAN access point, WiFi node or any other suitable term in the field, as long as the same technical effect is achieved, the base station is not limited to specific technical terms. The specific type of the base station is not limited.

The base station may communicate with a terminal 11 under the control of a base station controller, which may be part of a core network or certain base stations in various examples. Some base stations can communicate control information or user data with the core network through the backhaul. In some examples, some of these base stations may communicate with each other directly or indirectly via a backhaul link, which may be a wired or wireless communication link. A wireless communication system may support operation on multiple carriers (waveform signals of different frequencies). A multi-carrier transmitter is capable of transmitting modulated signals on the multiple carriers simultaneously. For example, each communication link may be a multi-carrier signal modulated according to various radio technologies. Each modulated signal may be sent on a different carrier and may carry control information (e.g., reference signal, control channel, etc.), overhead information, data, and so on.

A base station may communicate wirelessly with terminals 11 via one or more access point antennas. Each base station may provide communication coverage for a respective coverage area. The coverage area of an access point may be divided into sectors that constitute only a portion of the coverage area. A wireless communication system may include different types of base stations (e.g., macro base stations, micro base stations, or pico base stations). The base stations may also utilize different radio technologies, such as cellular or WLAN radio access technologies. Base stations may be associated with the same or different access networks or operator deployments. The coverage areas of different base stations (including coverage areas of base stations of the same or different types, coverage areas utilizing the same or different radio technologies, or belonging to the same or different access networks) may overlap.

Communication links in a wireless communication system may include an uplink for carrying uplink (UL) transmissions (e.g., from terminal 11 to network device 12), or a downlink for carrying downlink (DL) transmissions (e.g., from network device 12 to terminal 11). UL transmissions can also be called reverse link transmissions, and DL transmissions can also be called forward link transmissions. Downlink transmissions may be performed using licensed frequency bands, unlicensed frequency bands, or both. Similarly, uplink transmissions may be performed using licensed frequency bands, unlicensed frequency bands, or both.

In related art, in the disconnected state, the GC scheduling transmission mechanism is currently not supported. If the CG scheduling transmission mechanism in the connected state is directly applied to the disconnected state, the base station will not be able to obtain the CSI information of the downlink beamforming, the reason is that in the disconnected state (idle state/inactive state), the UE will not report channel state information (CSI) to the base station.

Figure 8:
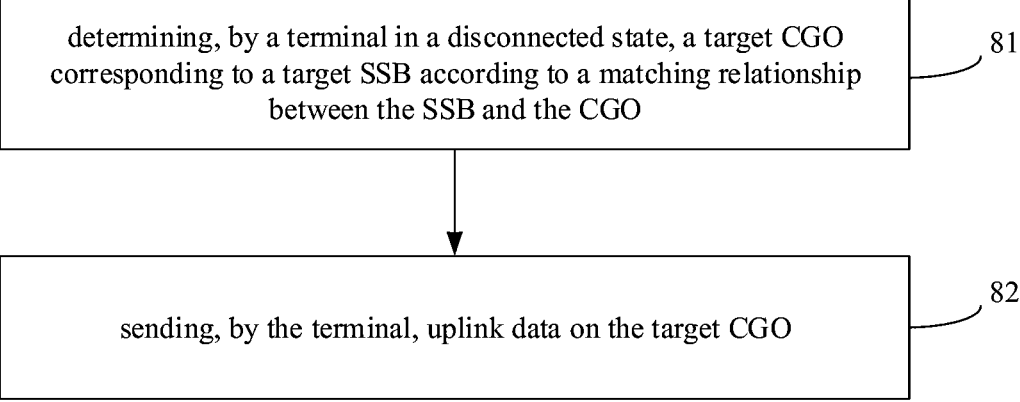
FIG. 8 is a schematic flowchart showing a data transmission method according to at least one embodiment of the present disclosure.

FIG. 8. shows a data transmission method provided by an embodiment of the present disclosure, applied to the terminal side, and includes:

Step 81, determining, by a terminal in a disconnected state, a target configured grant occasion (CGO) corresponding to a target Synchronization Signal and PBCH block (SSB) according to a matching relationship between the SSB and the CGO.

Here, the base station usually broadcasts and sends at least one SSB, and the total number of the at least one SSB is recorded as $SSB_{total}$, the at least one SSB and/or $SSB_{total}$ is usually configured by the base station to the terminal, and specifically can be configured by sending a configuration message in a broadcast or unicast mode. The terminal may select one SSB from the at least one SSB as the target SSB according to the reception conditions of each SSB, for example, select the SSB with the best received signal quality as the target SSB. Of course, the embodiment of the present disclosure may also select the target SSB according to other strategies, which is not specifically limited in the embodiment of the present disclosure.

Step 82, sending, by the terminal, uplink data on the target CGO.

Through the above steps, in the embodiment of the present disclosure, the terminal uses the CGO corresponding to the SSB to send uplink data, so that the base station can use the beam corresponding to the SSB to receive the data sent by the terminal in the disconnected state on the CGO corresponding to the SSB, thereby in the absence of CSI information of downlink beamforming, the beam corresponding to the SSB can be used for data transmission, thereby realizing the data transmission of a terminal in a disconnected state based on a CG mechanism.

Before the above step 81, the terminal may also determine the matching relationship between the SSB and CGO according to the configuration of the base station; or, the terminal obtains the matching relationship between the SSB and CGO through calculation. Wherein, the matching relationship is valid in at least one matching period, and the matching period is pre-configured or pre-agreed.

Specifically, in the above step 81, the terminal may determine the serial number of each CGO in the matching period; then, according to the matching relationship between the SSB serial number and the CGO serial number, determine the serial number of the target CGO corresponding to the target SSB.

In the embodiment of the present disclosure, each CGO may be numbered according to a preset numbering rule. Several numbering rules that can be used in the embodiments of the present disclosure are provided below, and the terminal can determine the serial number of each CGO in the matching period according to one of the following numbering rules:

numbering rule 1: numbering according to an order of a time domain first and then a frequency domain, determining the serial number of each CGO in the matching period;

numbering rule 2: numbering according to an order of the frequency domain first and then the time domain, determining the serial number of each CGO in the matching period;

numbering rule 3: in each slot in the matching period, numbering in the order of the time domain first and then the frequency domain, and numbering in a chronological order between slots in the matching period; or, in each slot in the matching period, numbering in the order of the frequency domain first and then the time domain, and numbering in the chronological order between the slots in the matching period.

When determining the serial number of each CGO in the matching period, the embodiment of the present disclosure can also address the case of CGOs overlapping in time domains with different starting OFDM symbols, performing numbering in an order from a nearest time to a farthest time corresponding to the starting OFDM of each CGO; in the case of CGOs overlapping in frequency domains with different starting OFDM symbols, performing numbering in an ascending order of a smallest PRB serial number in each CGO. Here, the order from the nearest time to the farthest time means that the time is earlier, the number is smaller, and the time is later, the number is larger.

Considering that some slots may be configured as uplink and downlink or flexible slots, it is necessary to consider whether the CGOs in these slots are valid when numbering CGOs. If invalid, these invalid CGOs do not need to be numbered. Specifically, it may be determined whether the CGO of each slot is valid according to the slot configuration, wherein, 1) when the slot is configured as UL, the CGO configured in the slot is valid; 2) when the slot is configured as DL, the CGO configured in the slot is invalid; 3) when the slot is configured as flexible, the CGO configured in the slot is determined to be valid or invalid, and which can be set in advance.

As the first matching method, the terminal can obtain the matching relationship between the SSB and the CGO through calculation. Specifically, the terminal can perform calculation in the following manner:

1) when a total number $CGO_{total}$ of CGOs in the matching period is greater than a total number $SSB_{total}$ of SSBs, calculating a value of $K_1$ according to $K_1 = \lfloor CGO_{total}/ SSB_{total} \rfloor$; starting from the CGO with the smallest serial number in the matching period, sequentially matching each consecutive $K_1$ CGOs with one SSB in the SSBs, or dividing the CGOs in the matching period into $K_1$ groups, each CGO group containing $SSB_{total}$ CGOs, and sequentially matching one CGO in each CGO group with the one SSB in the SSBs;

2) when $CGO_{total}$ is not greater than $SSB_{total}$, calculating a value of $K_2$ according to $K_2 = \lfloor SSB_{total}/CGO_{total} \rfloor$; starting from the SSB with the smallest serial number, sequentially matching each $K_2$ SSBs with one CGO in the matching period, or, dividing the SSBs into $K_2$ groups, each SSB group containing $CGO_{total}$ SSBs, and sequentially matching one SSB in each SSB group with one CGO in the matching period.

As the second matching method, the terminal may determine the matching relationship between the SSB and the CGO according to the configuration of the base station, specifically:

1) when a matching ratio R of SSB and CGO configured by the base station is an integer greater than 1, starting from the SSB with the smallest serial number, sequentially matching every R SSBs with one CGO in the matching period, or, dividing the SSBs into R groups, and each SSB group containing the total number of CGO SSBs, and sequentially matching one SSB in each SSB group with one CGO in the matching period;

2) when the matching ratio R of SSB and CGO configured by the base station is not greater than 1, and 1/R is an integer, starting from the CGO with the smallest serial number in the matching period, sequentially matching each consecutive 1/R CGOs with one SSB in the SSBs, or dividing the CGOs in the matching period into 1/R groups, each CGO group containing a total number of SSB CGOs, and sequentially matching one CGO in each CGO group with one SSB in the SSBs.

Considering that CG may be configured as repetition, in the case that the CG is configured as repetition, in the matching relationship, M transmission opportunities TO in one CGO are used as a repetition bundle, which is corresponding to one or more SSBs; or, N CGOs correspond to one or more SSBs as one repetition bundle, wherein each of the N CGOs includes one TO, and the N is less than or equal to the maximum number of CGOs in the matching period, the serial number of the starting CGO of the repetition bundle is an integer multiple of N.

In addition, whether one repetition bundle corresponds to one or more SSBs is determined according to the matching relationship between the SSBs and CGOs.

In addition, in the embodiment of the present disclosure, the CGO may be configured on a BWP other than the initial BWP.

Optionally, when a single user (single terminal) supports multiple sets of CG configurations, each set of CG configurations independently sets the matching relationship with the SSB, or multiple sets of CGs set the same matching relationship with the SSB. The embodiment of the present disclosure can flexibly set the matching relationship of each set of CG configurations.

The methods in the embodiments of the present disclosure have been described above from the terminal side. The following further describes from the base station side.

Figure 9:
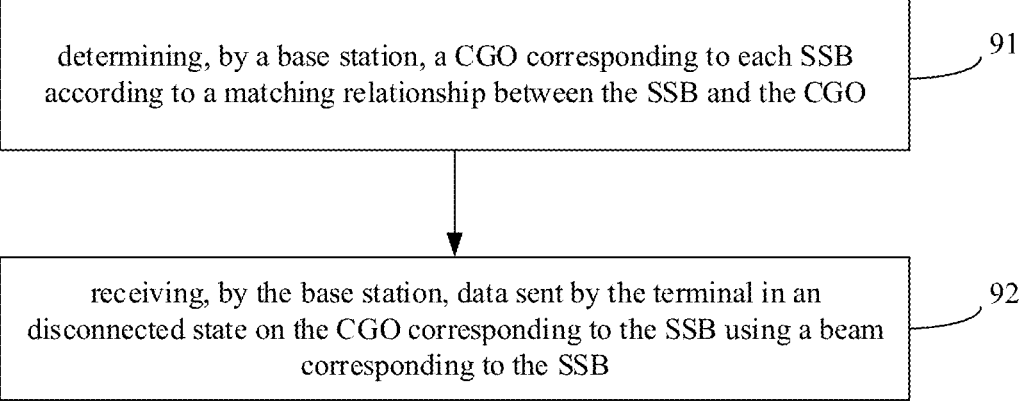
FIG. 9 is another schematic flowchart showing a data transmission method according to at least one embodiment of the present disclosure.

FIG. 9 shows the data transmission method provided by the embodiment of the present disclosure, applied to the base station side, and includes:

Step 91, determining, by a base station, a CGO corresponding to each SSB according to a matching relationship between the SSB and the CGO.

Here, the matching relationship between the SSB and the CGO may be determined by the base station according to the configuration, or calculated by the base station, wherein the matching relationship is valid in at least one matching period, and the matching period is preconfigured or pre-agreed. For example, when the base station configures the matching relationship, the base station may also send configuration signaling to the terminal to configure the matching relationship between the SSB and CGO, so that the terminal can obtain the same matching relationship.

In step 92, receiving, by the base station, data sent by the terminal in an disconnected state on the CGO corresponding to the SSB using a beam corresponding to the SSB.

Through the above steps, the base station can receive the uplink data sent by the terminal using the CGO corresponding to the SSB. When receiving the uplink data, the base station can use the beam corresponding to the SSB, so that in the case of without CSI information of downlink beamforming, the beam corresponding to the SSB is used for data transmission, thereby realizing a data transmission of a terminal in an disconnected state based on a CG mechanism.

Specifically, in the above step 91, the base station may determine the serial number of each CGO in the matching period; then, according to the matching relationship between the SSB serial number and the CGO serial number, determine the serial number of the target CGO corresponding to the target SSB. In the embodiment of the present disclosure, each CGO may be numbered according to a preset numbering rule. Several numbering rules that can be used in the embodiments of the present disclosure are provided below, and the base station can determine the serial number of each CGO in the matching period according to one of the numbering rules mentioned above, which will not be repeated here.

Similarly, When the base station determines the serial number of each CGO in the matching period, the embodiment of the present disclosure can also address the case of CGOs overlapping in time domains with different starting OFDM symbols, performing numbering in an order from a nearest time to a farthest time corresponding to the starting OFDM of each CGO; in the case of CGOs overlapping in frequency domains with different starting OFDM symbols, performing numbering in an ascending order of a smallest PRB serial number in each CGO. Here, the order from the nearest time to the farthest time means that the time is earlier, the number is smaller, and the time is later, the number is larger.

Similarly, considering that some slots may be configured as uplink and downlink or flexible slots, it is necessary to consider whether the CGOs in these slots are valid when numbering CGOs. If invalid, these invalid CGOs do not need to be numbered. Specifically, it may be determined whether the CGO of each slot is valid according to the slot configuration, wherein, 1) when the slot is configured as UL, the CGO configured in the slot is valid; 2) when the slot is configured as DL, the CGO configured in the slot is invalid; 3) when the slot is configured as flexible, the CGO configured in the slot is determined to be valid or invalid.

As the first matching method, the terminal can obtain the matching relationship between the SSB and the CGO through calculation. Specifically, the terminal can perform calculation in the following manner:

1) when a total number $CGO_{total}$ of CGOs in the matching period is greater than a total number $SSB_{total}$ of SSBs, calculating a value of $K_1$ according to $K_1=\lfloor CGO_{total}/SSB_{total}\rfloor$; starting from the CGO with the smallest serial number in the matching period, sequentially matching each consecutive $K_1$ CGOs with one SSB in the SSBs, or dividing the CGOs in the matching period into $K_1$ groups, each CGO group containing $SSB_{total}$ CGOs, and sequentially matching one CGO in each CGO group with the one SSB in the SSBs;

2) when $CGO_{total}$ is not greater than $SSB_{total}$, calculating a value of $K_2$ according to $K_2=\lfloor SSB_{total}/CGO_{total}\rfloor$; starting from the SSB with the smallest serial number, sequentially matching each $K_2$ SSBs with one CGO in the matching period, or, dividing the SSBs into $K_2$ groups, each SSB group containing $CGO_{total}$ SSBs, and sequentially matching one SSB in each SSB group with one CGO in the matching period.

As the second matching method, the terminal may determine the matching relationship between the SSB and the CGO according to the configuration of the base station, specifically:

1) when a matching ratio R of SSB and CGO configured by the base station is an integer greater than 1, starting from the SSB with the smallest serial number, sequentially matching every R SSBs with one CGO in the matching period, or, dividing the SSBs into R groups, and each SSB group containing the total number of CGO SSBs, and sequentially matching one SSB in each SSB group with one CGO in the matching period;

2) when the matching ratio R of SSB and CGO configured by the base station is not greater than 1, and 1/R is an integer, starting from the CGO with the smallest serial number in the matching period, sequentially matching each consecutive 1/R CGOs with one SSB in the SSBs, or dividing the CGOs in the matching period into 1/R groups, each CGO group containing a total number of SSB CGOs, and sequentially matching one CGO in each CGO group with one SSB in the SSBs.

Considering that CG may be configured as repetition, in the case that the CG is configured as repetition, in the matching relationship, M transmission opportunities TO in one CGO are used as a repetition bundle, which is corresponding to one or more SSBs; or, N CGOs correspond to one or more SSBs as one repetition bundle, wherein each of the N CGOs includes one TO, and the N is less than or equal to the maximum number of CGOs in the matching period, the serial number of the starting CGO of the repetition bundle is an integer multiple of N.

In addition, in the embodiment of the present disclosure, the CGO may be configured on a BWP other than the initial BWP.

Optionally, when a single user (single terminal) supports multiple sets of CG configurations, each set of CG configurations independently sets the matching relationship with the SSB, or multiple sets of CGs set the same matching relationship with the SSB. The embodiment of the present disclosure can flexibly set the matching relationship of each set of CG configurations.

The methods in the embodiments of the present disclosure have been described respectively from the side of the terminal and the base station. To help better understand the present disclosure, several specific examples are provided below.

Example 1

This example is for the case where both SSB and CGO are in the same bandwidth part (BWP). Before the terminal (UE) enters the disconnected state, the gNB sends the matching ratio parameter (ssb-perCG-occasion) between SSB and CGO through high-level signaling for matching between SSB and CGO, and sends related configuration parameters of CG for configuring the CG scheduling transmission of the UE in the disconnected state. At the same time, the gNB can configure one matching period, and perform matching between the SSB and the CGO in the matching period. ssb-perCG-occasion can specifically indicate 1:1, 2:1, 1:2, etc.

In a matching period, the matching relationship between the SSB and the CGO is configured through the RRC parameter or the matching relationship between the SSB and the CGO is obtained through a calculation method. The matching period can be directly configured by the high layer or configured by an indirect method (such as an integer multiple of the CGO period).

If the CG is not configured with repetition, in a matching period, the CGOs are numbered first, and then matching is performed according to the matching rules between the SSB and the CGOs.

The specific numbering rules are as follows:

Rule 1: Numbering in the order of the frequency domain first and then the time domain in the matching period;

Rule 2: Numbering in the order of the time domain first and then the frequency domain in one matching period;

Rule 3: Taking the slot as an unit, numbering in the order of the time domain first and then the frequency domain, and between slots, numbering in a chronological order; or taking the slot as the unit, numbering in the order of the frequency domain first and then the time domain, and between slots, numbering in a chronological order.

For the case of CGOs overlapping time domains with different start/end symbols, numbering according to the starting OFDM serial number of each CGO from small to large; for the case of CGOs overlapping frequency domains with different start/end symbols, numbering according to the smallest PRB serial number in each CGO from small to large.

Before numbering, it is necessary to determine whether the CGO of each slot is valid according to the slot configuration. If the slot is configured as Flexible/UL, then the CGO configured in the slot is valid. If the slot is configured as DL, then the CGO configured in the slot is invalid.

FIG. 1 shows a matching relationship, when both SSB and CGO are in the initial BWP, SSBs and CGOs are in one-to-one correspondence. SSB0 corresponds to CGO, SSB1 corresponds to CG1, SSB2 corresponds to CG2, and SSB3 corresponds to CG3. It should be noted that, for the convenience of representation, CG is used to represent CGO in FIGS. 1 to 6B, that is, CG0 represents CGO0, CG1 represents CGO1, and so on.

Figure 2A:
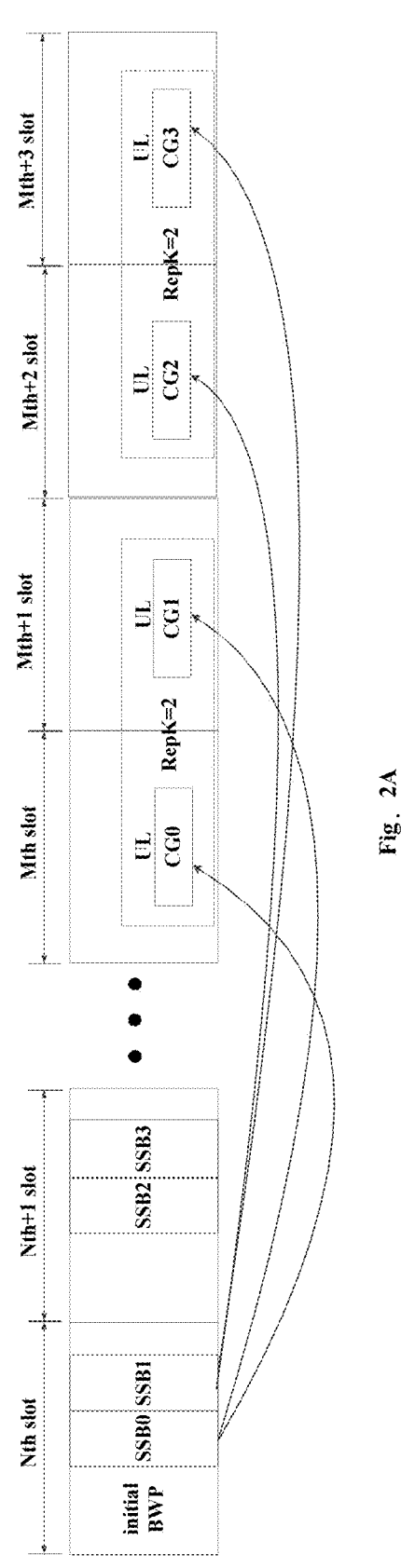
FIGS. 2A to 2I are schematic diagrams showing several matching relationships between SSB and CGO according to at least one embodiment of the present disclosure.
Figure 2B:
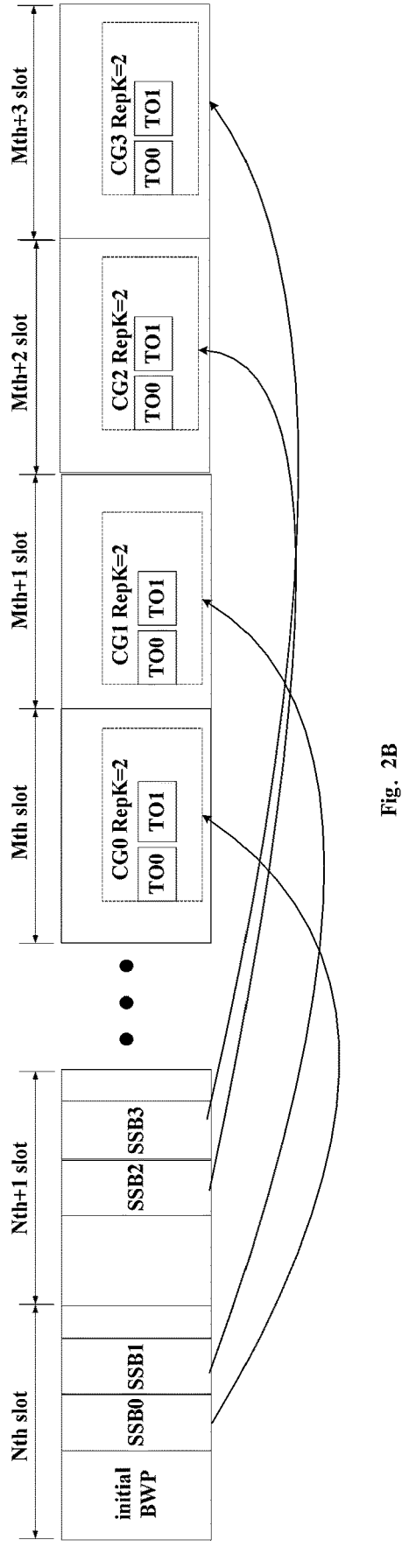
Figure 2C:
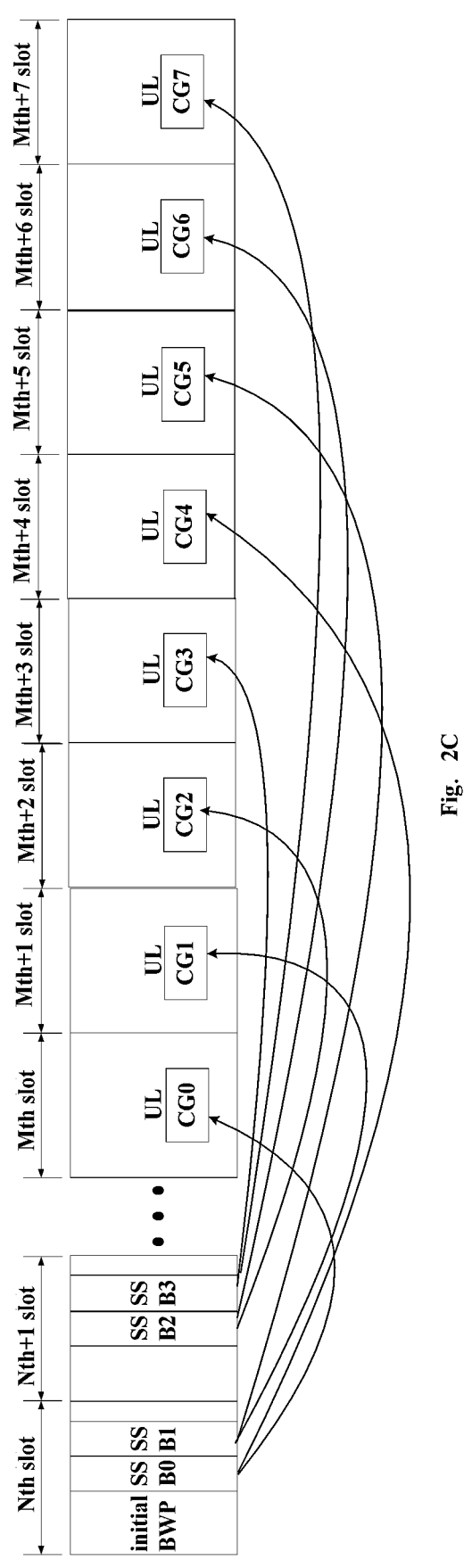

If the CG scheduling transmission supports repetition, there are two possible resource matching methods as shown in FIG. 2A and FIG. 2C. As shown in FIG. 2A, if the number of repetitions is 2, two consecutive CGOs match one SSB, so the corresponding relationship is: SSB0 corresponds to CGO and CG1; SSB1 corresponds to CG2 and CG3. As shown in FIG. 2C, if the number of repetitions is 2, there are other matching methods between SSB and CGO, namely: SSB0 corresponds to CGO and CG4, SSB1 corresponds to CG1 and CG5, SSB2 corresponds to CG2 and CG6, and SSB3 corresponds to CG3 and CG7.

The base station configures CG scheduling transmission for the terminal in the disconnected state by using the two parameters ssb-perCG-occasion and Periodicity through high-level signaling. The ssb-perCG-occasion parameter is used to indicate the matching relationship between SSB and CGO in one matching period, for example, one SSB corresponds to multiple CGOs, one SSB corresponds to one CGO, and multiple SSBs correspond to one CGO.

First ssb-perCG-occasion is compared with 1. If ssb-perCG-occasion>1, it means that multiple SSB serial numbers correspond to one CGO. Therefore, ssb-perCG-occasion SSBs are divided into one group first, and then matching of CGO and SSB is performed according to Method 1; if ssb-perCG-occasion<1, it means that one SSB serial number corresponds to multiple CGOs, 1/ssb-perCG-occasion CGOs are divided into one group first, and then matching of CGOs and SSBs is performed according to Method 1;

Periodicity indicates the length of a period for CG scheduling transmission. M indicates the number of the CGO periods in a matching period between CGO and SSB (optionally, an integer multiple of CGO periods).

An example of configuring the CG is as follows:

```
ConfiguredGrantConfig ::=          SEQUENCE {
ssb-perCG-occasion                 (N1 bits)
Periodicity                        (N2 bits)
M                                  (N3 bits)
}
```

TCG indicates the matching period between SSB and CGO. In TCG=M*Periodicity, the matching relationship remains unchanged. The matching period can be directly configured by the high layer or configured by an indirect method (such as an integer multiple of the CGO period or an integer multiple of the SSB period).

In TCG, the matching relationship between SSB and CGO is as follows.

For example: total number of SSB=4, total number of CG repetitions N=2, ssb-perCG-occasion=2:1

The matching period is M=8 CGO periods, Periodicity=1 ms, when each CGO period contains one CGO, the matching process is as follows.

A) First, the matching period between SSB and CGO is set, the matching period can be directly configured through high-level signaling or obtained by indicating an integer multiple of the CGO period through high-level signaling. The matching period is TCG=M*Periodicity=8 ms.

B) Then the total number of CGOs in a matching period is calculated as 8, and the CGOs in a matching period is numbered (0-7). The numbering principle is: first fixing the time domain resource number and slot number, and then increasing the frequency domain number to number the CGO, and then sequentially increasing the time domain resource number and slot number.

Here, the time-domain resource serial number is set in a time order first, and then numbering is performed according to the same time-domain resource and multiple frequency-domain resources from the smallest PRB frequency index.

C) In one matching period, both SSB and CGO are matched sequentially starting from the smallest serial number. The total number of SSBs is determined to be 4 according to the SSB configuration.

D) According to the number of CG repetitions N=2, the adjacent N CGOs are used as one repetition bundle to correspond to the SSB;

E) the total number of CG repetition bundles is calculated as the total number of CGs/CG repetition times in one matching period; the total number of CGO repetition bundles in the above example is 8/2=4

F) The matching relationship between SSB and CGO determined by the calculation formula $K=\lfloor CGO_{total}/SSB_{total}\rfloor$ is: K=total number of CG repetition bundles/total number of SSBs=1, (here the total number of CG repetition bundles is taken as $CGO_{total}$) or the corresponding ratio of SSB and CGO is directly determined as 2:1 according to the matching ratio ssb-perCG-occasion of SSB and CGO configured by the high layer signaling. Because ssb-perCG-occasion>1, two SSBs are divided into one group, and CG repetition=2, 2 CGOs are divided into one group, and then SSB is matched with CGO.

Finally, the matching relationship between SSB and CGO is finally determined as follows.

Figures 2D, 2E:
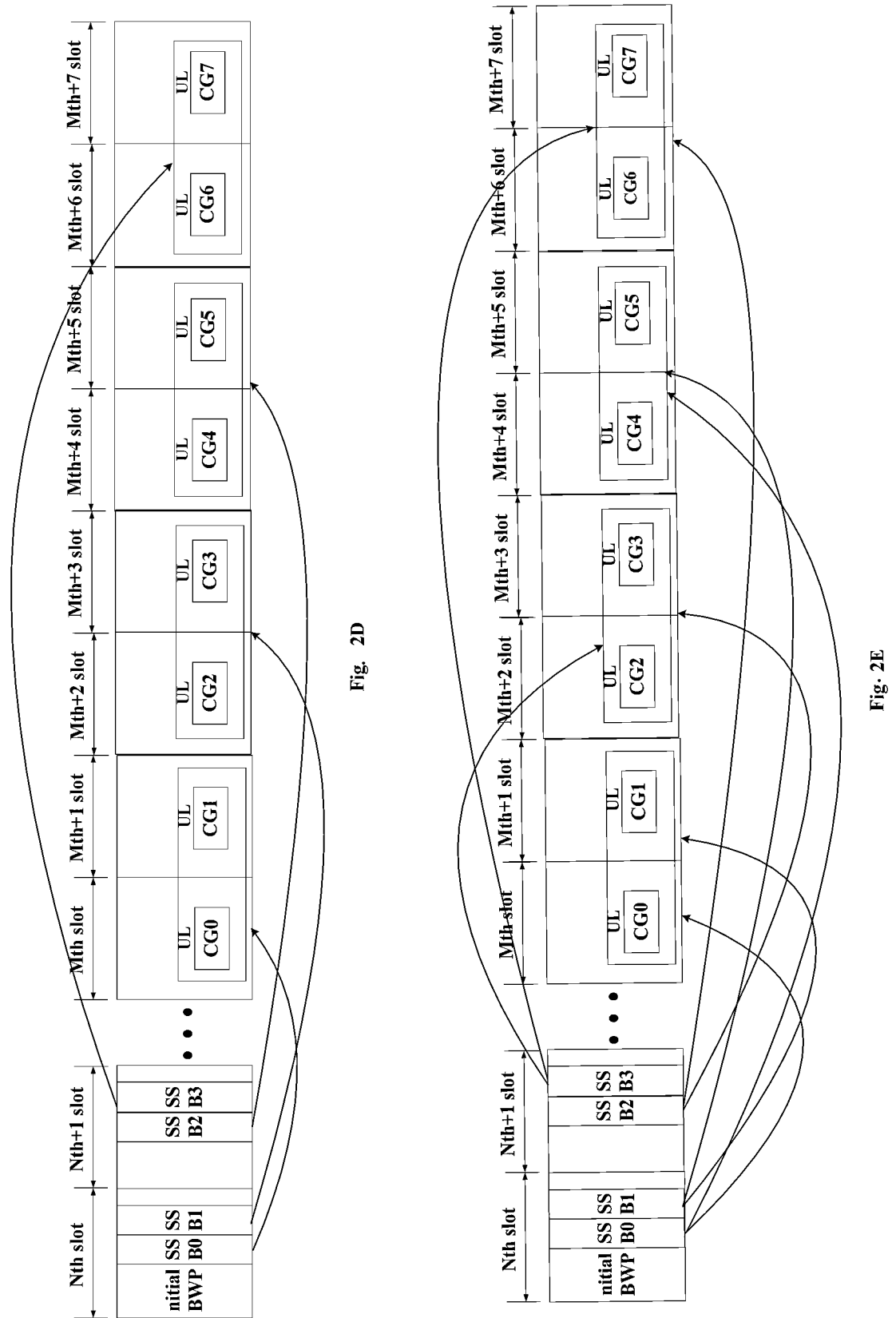

G) The matching relationship determined according to the calculation is: SSB0 corresponds to CGO&CG1, SSB1 corresponds to CG2&CG3, SSB2 corresponds to CG4&CG5, and SSB3 corresponds to CG6&CG7, as shown in FIG. 2D.

H) the 2:1 matching relationship between SSB and CGO is determined according to the ssb-perCG-occasion parameter: SSB0&SSB1 corresponds to CGO&CG1, SSB2&SSB3 corresponds to CG2&CG3, SSB0&SSB1 corresponds to CG4&CG5, and SSB2&SSB3 corresponds to CG6&CG7, as shown in FIG. 2E.

Figures 3A, 3B:
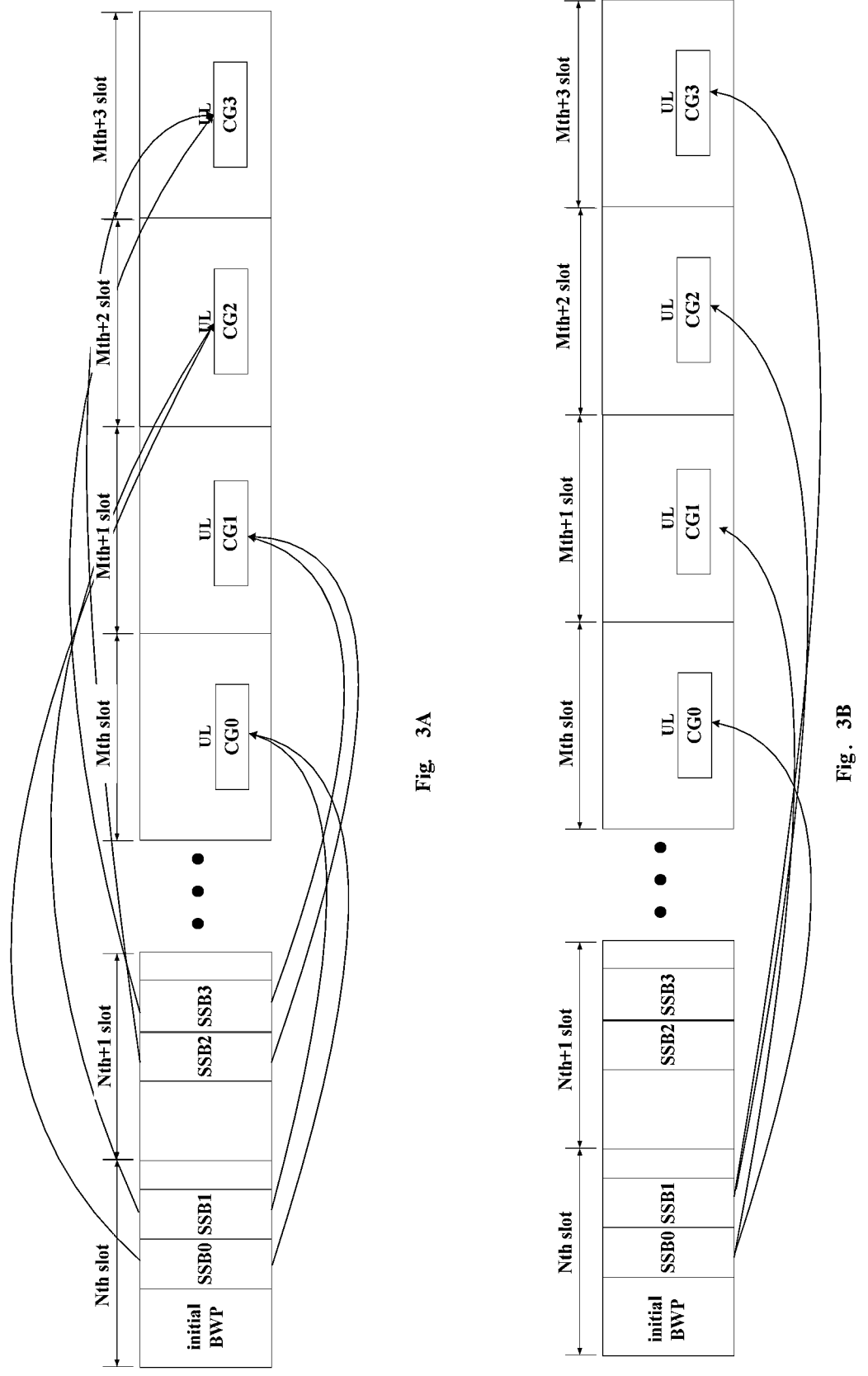
FIGS. 3A to 3B are schematic diagrams showing several matching relationships between SSB and CGO according to at least one embodiment of the present disclosure.

The base station (gNB) can configure the matching ratio of SSB and CGO through the ssb-perCG-occasion parameter, as shown in FIG. 3A, FIG. 1 or FIG. 3B. FIG. 3A shows that SSB and CGO are 2:1, that is, 2 SSBs correspond to 1 CGO. FIG. 1 shows that SSB and CGO are 1:1, that is, one SSB corresponds to one CGO. FIG. 3B shows that SSB and CGO are 1:2, that is, 1 SSB corresponds to 2 CGOs.

Figures 2F, 2G:
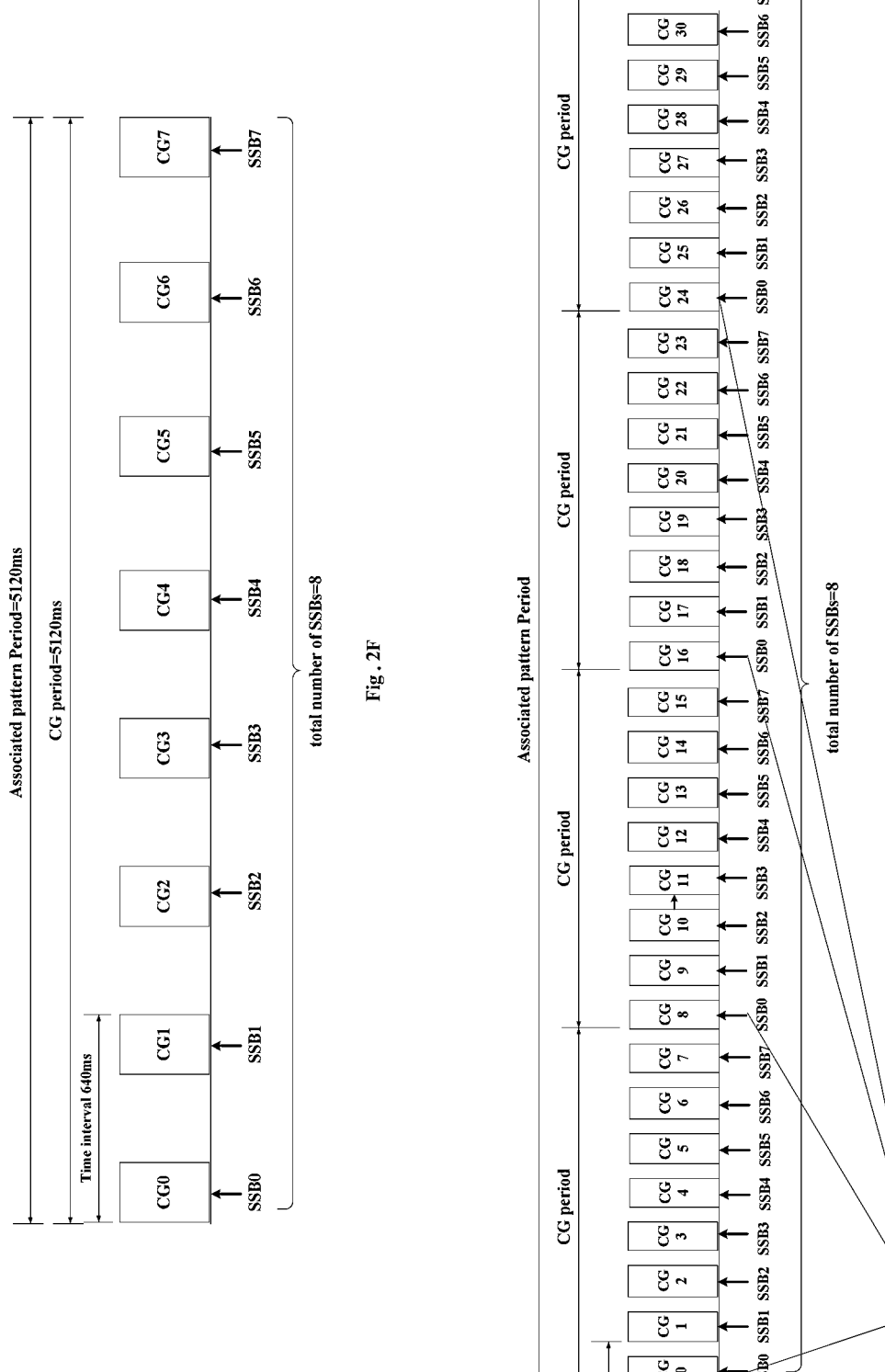

As shown in FIG. 2F, if the CGO period is large, the matching period can be the same as the CGO period, and the same number of CGOs as SSBs can be configured in one matching period. The time interval between two CGOs is matching period/total number of SSBs.

As shown in FIG. 2G, the matching period includes 4 CGO periods, and the same number of CGOs as the total number of SSBs are configured in each CGO period, which can reduce the data transmission delay on the CGO corresponding to each SSB. The CGO corresponding to the same SSB may be used for repetition transmission.

Figures 2H, 2I:
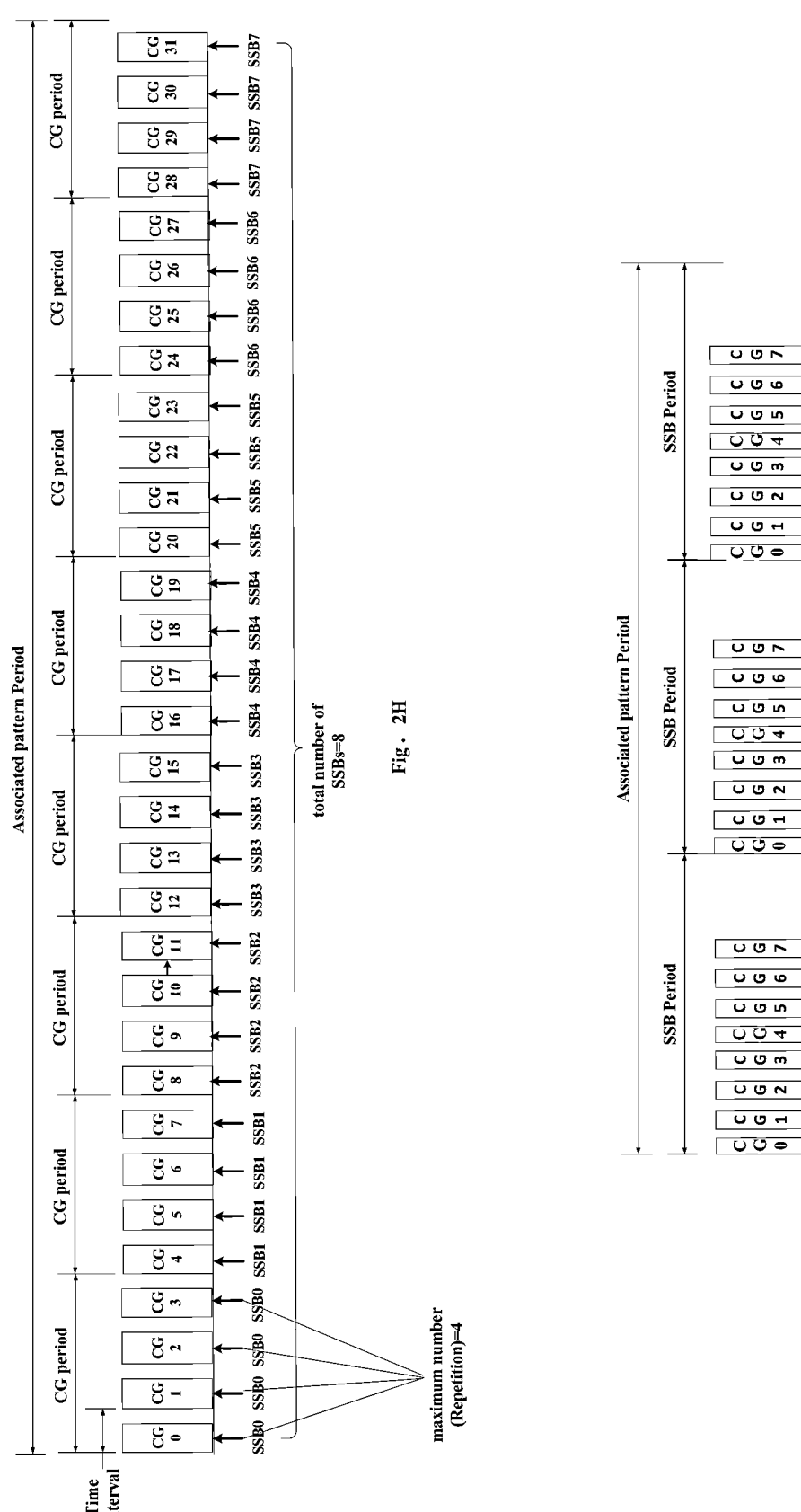

As shown in FIG. 2H, the matching period includes 8 CGO periods, and 4 CGO resources are configured in each CGO period, and each CGO period matches one SSB, and the CGO corresponding to the same SSB can be used for repetition transmission.

Figures 2J, 2K, 2L:
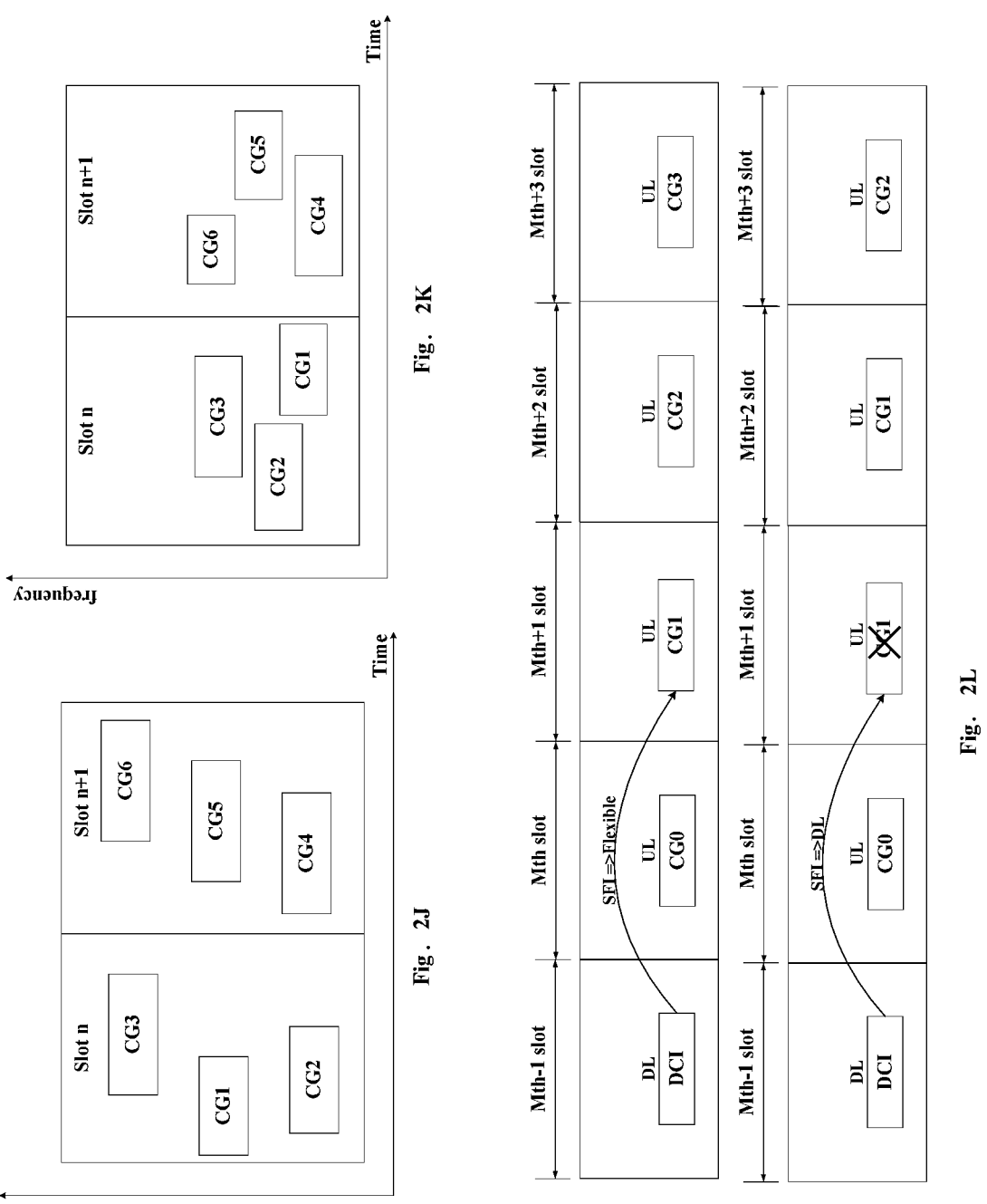
FIGS. 2J to 2K are schematic diagrams showing CGO serial numbers according to at least one embodiment of the present disclosure.
FIG. 2L is a schematic diagram showing CGO sorting when the uplink and downlink configurations are changed according to at least one embodiment of the present disclosure.

As shown in FIGS. 2J and 2K, in one matching period, under the configuration of multiple CGOs, when CGO time-frequency resources overlap, they can be numbered according to the starting OFDM serial number of each CGO from small to large. In the case of CGOs overlapping in the frequency domain and with different start/end symbols, the numbering is performed according to the smallest PRB serial number in each CGO from small to large.

When CG configures repetition, there are two matching methods between CGO and SSB:

Method 1: K Transmission Occasions (TO) in one CGO are used as one repetition bundle to correspond to one or more SSB serial numbers. Specifically, whether one repetition bundle corresponds to one or more SSB serial numbers can be determined according to the matching relationship.

Method 2: N (continuous or non-continuous) CGOs (each CGO contains 1 TO) can be used as one repetition bundle to correspond to SSB, and the maximum value of N is the total number of CGOs contained in one matching period; N can be configured through RRC signaling, the starting CGO of the repetition bundle is a CGO whose CGO serial number can be divisible by N.

As shown in FIG. 2L, changes in the DL/UL configuration will affect the CGO sorting. If a slot indicated by the SFI of the DCI changes from UL to flexible, the CGO sorting remains unchanged. If a slot indicated by the SFI of the DCI changes from UL to DL, the CGO contained in this slot will be eliminated when the CGO is sorted.

FIG. 2B is a schematic diagram of method 1 when CG is configured with repetition. If the number of repetitions is 2, two TOs used for repetition transmission in one CGO can be directly matched with SSB. Each CGO corresponds to one SSB. SSB0 corresponds to CGO, SSB1 corresponds to CG1, SSB2 corresponds to CG2, and SSB3 corresponds to CG3.

FIG. 2A is a first schematic diagram of method 2 when the CG is configured with repetition. If the number of repetitions is 2, two consecutive CGOs match one SSB, so the corresponding relationship is: SSB0 corresponds to CGO and CG1; SSB1 corresponds to CG2 and CG3. As shown in FIG. 2C, if the number of repetitions is 2, there are other matching methods between SSB and CGO, namely: SSB0 corresponds to CGO and CG4, SSB1 corresponds to CG1 and CG5, SSB2 corresponds to CG2 and CG6, and SSB3 corresponds to CG3 and CG7. The starting point is the CGO whose CGO serial number can be divisible by 2. CGO and CG2 in the figure are the starting point of the repetition bundle.

FIG. 2C is the second schematic diagram of method 2 when the CG is configured with repetition. Regardless of CGO repetition, the matching relationship between SSB and CGO is first calculated. After the matching relationship is determined, the repetition bundle is performing for the same SSB corresponding to CGO. Therefore, in one matching period, the matching relationship between SSB and CGO is 8/4=2:1; after confirming the matching relationship between CGO and SSB, the CGO repetition bundle (CGO&CG4, CG1&CG5, CG2&CG6, CG3&CG7) is determined and the matching relationship between SSB and CGO is finally determined as: SSB0 corresponds to CGO&CG4, SSB1 corresponds to CG1&CG5, SSB2 corresponds to CG2&CG6, and SSB3 corresponds to CG3&CG7.

Example 2

This example is mainly for the matching relationship between SSB and CGO across BWPs, as shown in FIG. 3, mainly supporting the matching between SSBs and CGOs across BWPs. Because if the gNB configures too many CGOs in the initial BWP, the uplink load of the initial BWP will be too large. For uplink load balancing, CGOs are configured in other BWPs (working BWPs before the UE enters the disconnected state); at the same time, the gNB needs to configure the matching relationship between the SSB on the initial BWP and the CGO on other BWPs. At the same time, this also shows that the gNB corresponding to the SSB transmits the same beam as that received by the CGO. gNB needs to indicate which BWP is used for CG transmission in RRC release, and the details of BWP are as follows.

```
BWP ::= SEQUENCE {
    locationAndBandwidth
    subcarrierSpacing
    cyclicPrefix }
```

Example 3

Figures 4, 5A:
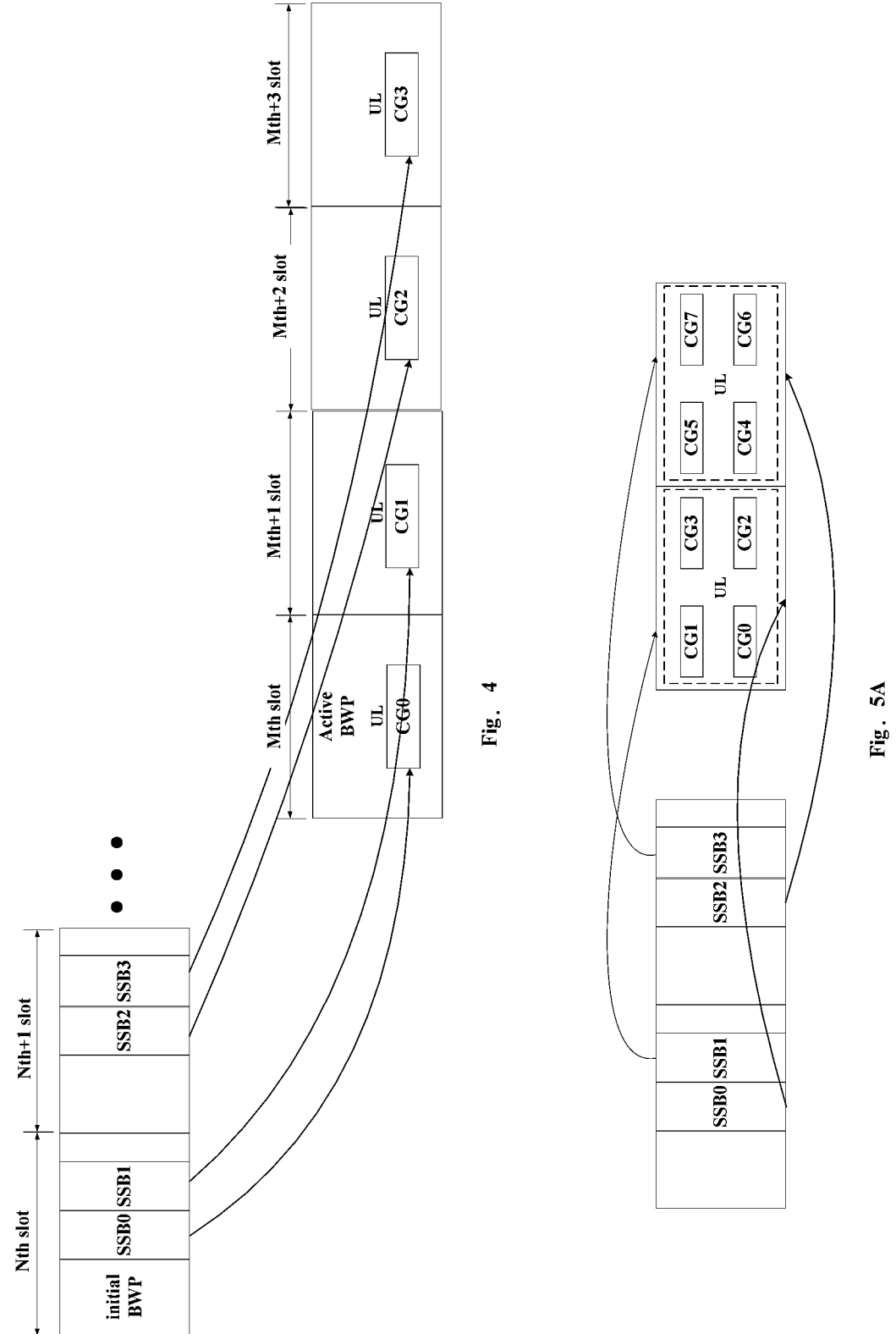
FIG. 4 is a schematic diagram showing SSB and CGO matching across BWPs according to at least one embodiment of the present disclosure.
FIGS. 5A to 5C are schematic diagrams showing several matching relationships between SSB and CGO according to at least one embodiment of the present disclosure.

This example mainly considers increasing the number of CGOs by configuring multiple CGO time-frequency resources in one period, thereby increasing the number of CGOs corresponding to the SSBs, which can reduce the transmission delay. Specifically, as shown in FIG. 5A, four CGOs are configured in one period, and each CGO corresponds to one SSB. In this way, although multiple CGOs are configured in one period, the UE will not send two CGOs at the same time, in addition, supporting multiple CGO configurations in one period can increase CG transmission resources.

In the case of configuring multiple CGOs in the time-frequency domain of one period, the CGOs need to be numbered first, and the numbering process is as follows:

1) the total number of CGOs in a matching period is calculated first (there are two CGO periods in one matching period and the number of CGs in one period is 4, the total number of CGs is 8), and then the CGOs in one matching period are numbered with the numbering principle that, first fixing the slot serial number and the time domain serial number, then increasing the frequency domain serial number to number the CGOs, and then increasing subsequently the time domain resource number and the slot number.

2) the time-domain resources serial numbers are set in a chronological order. In FIG. 5A, there are totally 4 time-domain resources in one matching period in the chronological order.

3) the numbering is performed according multiple frequency domain resources and the same time domain resource, starting with the smallest PRB frequency index, and there are 2 frequency domain resources.

Figures 5B, 5C:
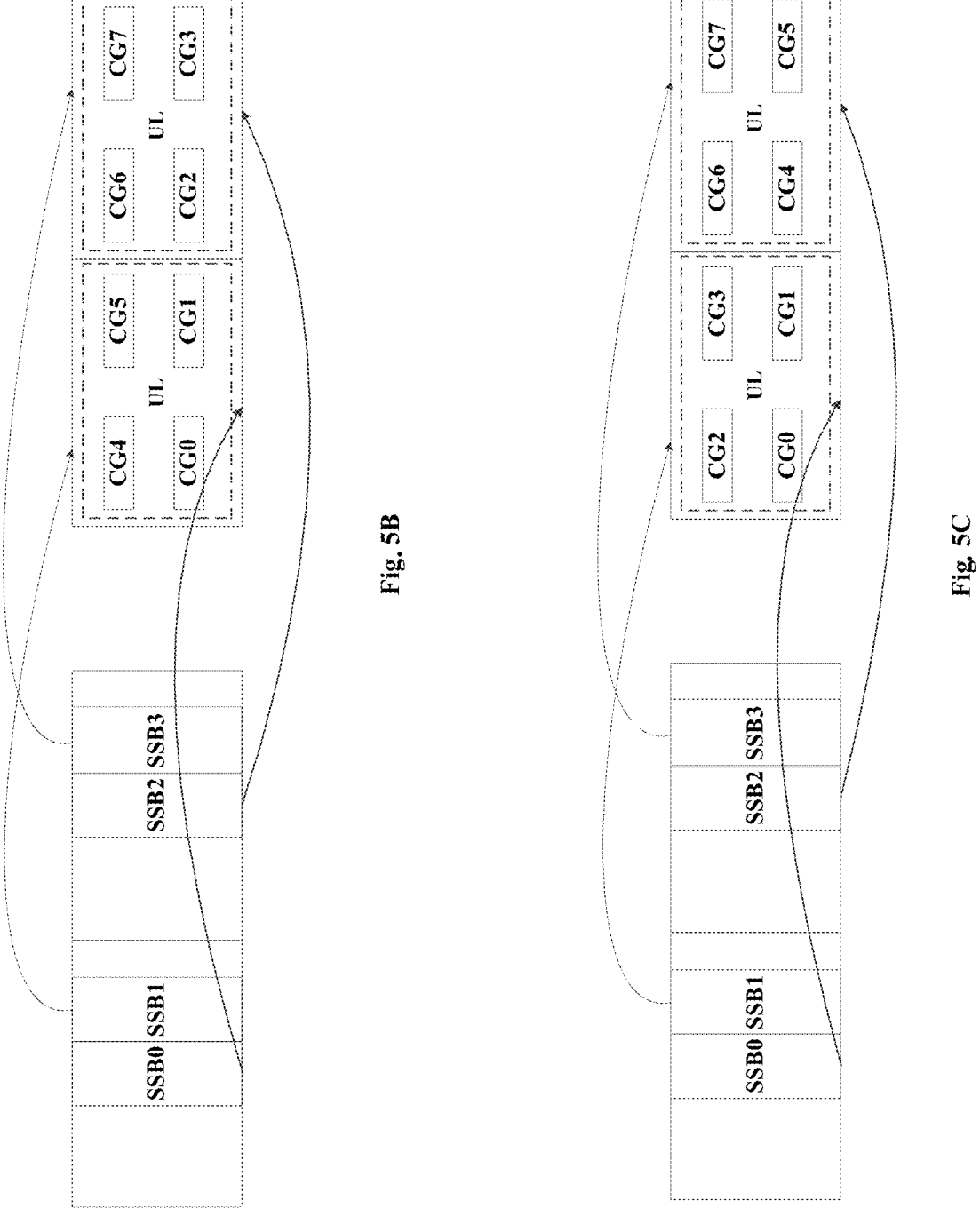

4) Then the CGs are numbered according to step 1, and the numbering results are shown in FIG. 5A. It can also be numbered as shown in FIG. 5B, first fixing a frequency domain resource number, and then sequentially increasing the time domain resource number and slot number; after all the CGO of the same frequency domain resource number are numbered, then adding the frequency domain resource number with 1 and then sequentially increasing the time-domain resource number and slot number until all CGO numbering are completed. Or as shown in FIG. 5C, the slot number and the frequency domain resource number are first fixed, and then the time domain resource number is added to number the CGOs, and then the frequency domain resource number and the slot number are sequentially increased.

5) After the CGO numbering is completed, the CGOs and SSBs in one matching period are matched one by one according to the SSB and CGO matching principle in Example 1.

Example 4

Figures 6A, 6B:
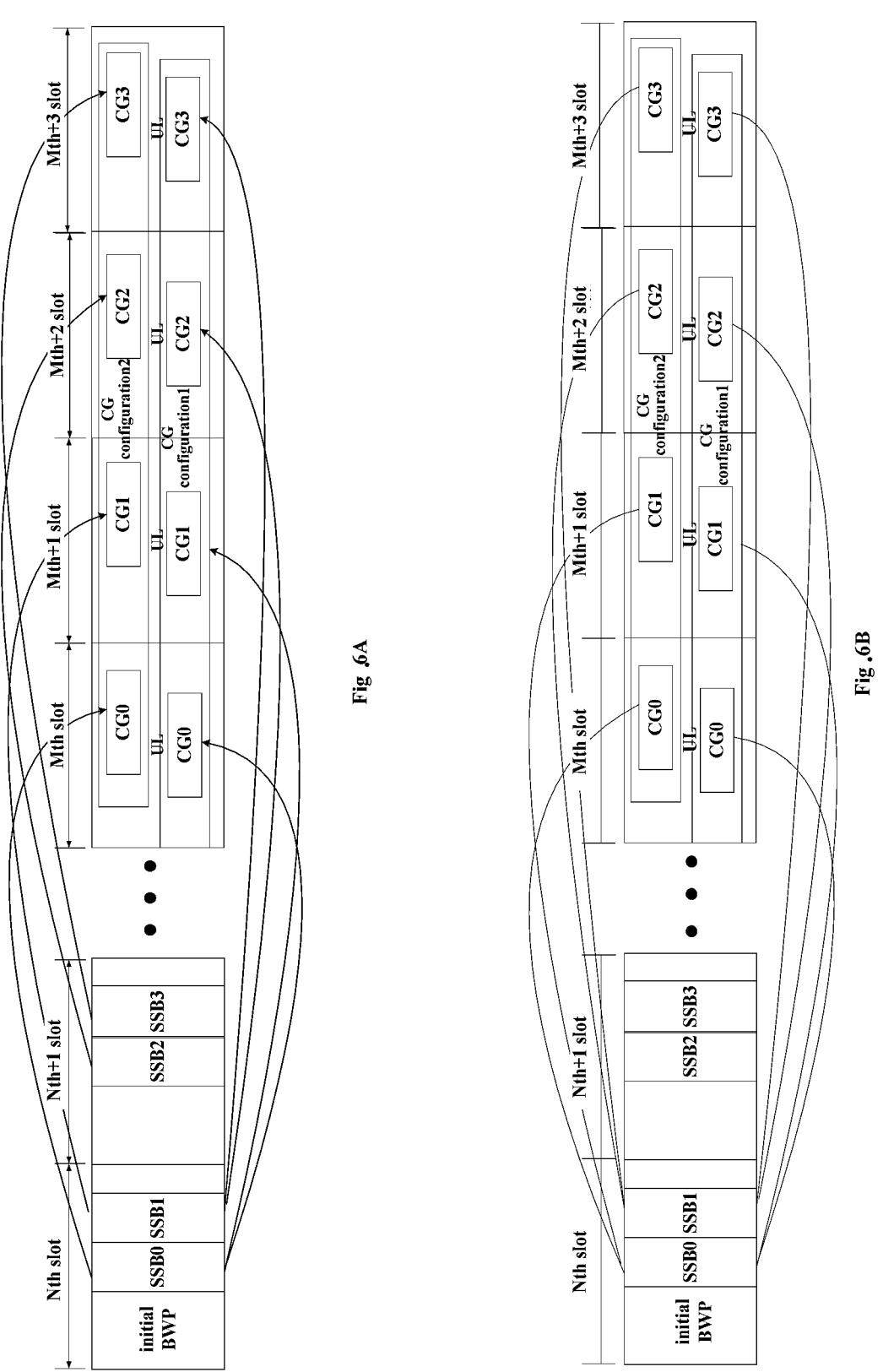
FIGS. 6A to 6B are schematic diagrams showing several matching relationships between SSB and CGO according to at least one embodiment of the present disclosure.

This example is mainly aimed at how one UE is configured with multiple sets of CG resources corresponding to SSB. As shown in FIGS. 6A and 6B. Two sets of CG resource configurations can be configured separately the matching relationship with SSB, that is mainly based on the allocation of CG resources and the amount of SSB configuration. The gNB can individually configure the matching relationship with SSB for each set of CG resources. As shown in FIG. 6A, the matching ratio between CG configuration 1 and SSB is 1:2, that is, one SSB corresponds to two CGO resources in CG configuration 1.

The matching ratio between CG configuration 2 and SSB is 1:1, that is, one SSB corresponds to one CGO resource in CG configuration 2. CG configuration 1 and CG configuration 2 are both independently configured the matching ratio with the SSB. The gNB may also configure only one matching ratio with the SSB for multiple sets of CG configurations. As shown in FIG. 6B, the gNB configures the same SSB matching ratio of 1:2 for CG configuration 1 and CG configuration 2, that is, one SSB corresponds to two CGO resources in the CG configuration, which can save RRC signaling overhead.

It can be seen from the above examples that the embodiment of the present disclosure associates the SSB with the CGO, and the gNB can use the Beam corresponding to the SSB to receive the uplink data sent by the UE. The SSB-based CG mechanism of the embodiments of the present disclosure can better support small data transmission in a disconnected state, thereby saving terminal power consumption and reducing network overhead caused by frequently accessing the network.

Various methods of the embodiments of the present disclosure have been introduced above. A device for implementing the above method will be further provided below.

Figure 10:
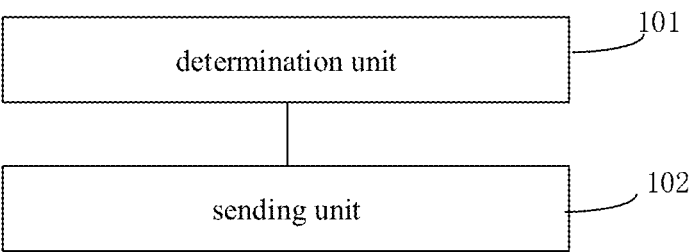
FIG. 10 is a schematic structural diagram showing a terminal according to at least one embodiment of the present disclosure.

Referring to FIG. 10, an embodiment of the present disclosure provides a terminal, including:

a determination unit 101, configured to determine a target configured grant occasion (CGO) corresponding to a target Synchronization Signal and PBCH block (SSB) according to a matching relationship between the SSB and the CGO when the terminal is in a disconnected state;

A sending unit 102, configured to send uplink data on the target CGO.

Optionally, the terminal also includes:

a matching relationship obtaining unit, configured to determine the matching relationship between the SSB and CGO according to the configuration of the base station; or, the terminal obtains the matching relationship between the SSB and CGO through calculation. Wherein, the matching relationship is valid in at least one matching period, and the matching period is pre-configured or pre-agreed.

The determination unit 101 is further configured to determine the serial number of each CGO in the matching period; then, according to the matching relationship between the SSB serial number and the CGO serial number, determine the serial number of the target CGO corresponding to the target SSB.

The determination unit 101 is further configured to determine the serial number of each CGO in the matching period according to one of the following numbering rules:

numbering rule 1: numbering according to an order of a time domain first and then a frequency domain, determining the serial number of each CGO in the matching period;

numbering rule 2: numbering according to an order of the frequency domain first and then the time domain, determining the serial number of each CGO in the matching period;

numbering rule 3: in each slot in the matching period, numbering in the order of the time domain first and then the frequency domain, and numbering in a chronological order between slots in the matching period; or, in each slot in the matching period, numbering in the order of the frequency domain first and then the time domain, and numbering in the chronological order between the slots in the matching period.

The determination unit 101 is further configured to, in the case of CGOs overlapping in time domains with different starting OFDM symbols, performing numbering in an order from a nearest time to a farthest time corresponding to the starting OFDM of each CGO; in the case of CGOs overlapping in frequency domains with different starting OFDM symbols, performing numbering in an ascending order of a smallest PRB serial number in each CGO.

The determination unit 101 is further configured to determine whether the CGO of each slot is valid according to the slot configuration before determining the serial number of each CGO in the matching period, wherein, when the slot configuration is UL, the CGO of the slot configuration is valid; when the slot configuration is DL, the CGO of the slot configuration is invalid; when the slot configuration is flexible, the CGO of the slot configuration is determined to be valid or invalid.

Optionally, the matching relationship obtaining unit is also configured to:

when a total number $CGO_{total}$ of CGOs in the matching period is greater than a total number $SSB_{total}$ of SSBs, calculating a value of $K_1$ according to $K_1 = \lfloor CGO_{total} / SSB_{total} \rfloor$; starting from the CGO with the smallest serial number in the matching period, sequentially matching each consecutive $K_1$ CGOs with one SSB in the SSBs, or dividing the CGOs in the matching period into $K_1$ groups, each CGO group containing $SSB_{total}$ CGOs, and sequentially matching one CGO in each CGO group with the one SSB in the SSBs;

when $CGO_{total}$ is not greater than $SSB_{total}$, calculating a value of $K_2$ according to $K_2 = \lfloor SSB_{total} / CGO_{total} \rfloor$; starting from the SSB with the smallest serial number, sequentially matching each $K_2$ SSBs with one CGO in the matching period, or, dividing the SSBs into $K_2$ groups, each SSB group containing $CGO_{total}$ SSBs, and sequentially matching one SSB in each SSB group with one CGO in the matching period.

Optionally, the matching relationship obtaining unit is also configured to:

when a matching ratio R of SSB and CGO configured by the base station is an integer greater than 1, starting from the SSB with the smallest serial number, sequentially matching every R SSBs with one CGO in the matching period, or, dividing the SSBs into R groups, and each SSB group containing the total number of CGO SSBs, and sequentially matching one SSB in each SSB group with one CGO in the matching period;

when the matching ratio R of SSB and CGO configured by the base station is not greater than 1, and 1/R is an integer, starting from the CGO with the smallest serial number in the matching period, sequentially matching each consecutive 1/R CGOs with one SSB in the SSBs, or dividing the CGOs in the matching period into 1/R groups, each CGO group containing a total number of SSB CGOs, and sequentially matching one CGO in each CGO group with one SSB in the SSBs.

Optionally, when the CG is configured as repeated transmission:

In the matching relationship, M transmission occasions TO in one CGO being used as one repetition bundle corresponding to one or more SSBs; or, N CGOs being used as one repetition bundle corresponding to one or more SSBs, wherein each of the N CGOs includes one TO, and the N is less than or equal to the maximum number of CGOs in the matching period, the serial number of the starting CGO of the repetition bundle being an integer multiple of N.

Optionally, the CGO is configured on a BWP other than the initial BWP.

Optionally, when a single user supports multiple sets of CG configurations, each set of CG configurations independently sets the matching relationship with the SSB, or multiple sets of CGs set the same matching relationship with the SSB.

It should be noted that the device in this embodiment is a device corresponding to the method shown in FIG. 8, and the implementations in the above embodiments are all applicable to this embodiment of the device, and can also achieve the same technical effect. The device provided by the embodiments of the present disclosure can realize all the method steps in the method embodiments, and can achieve the same technical effect, so the parts and beneficial effects in this embodiment that are the same as those of the method embodiments will not be described in detail here.

Figure 11:
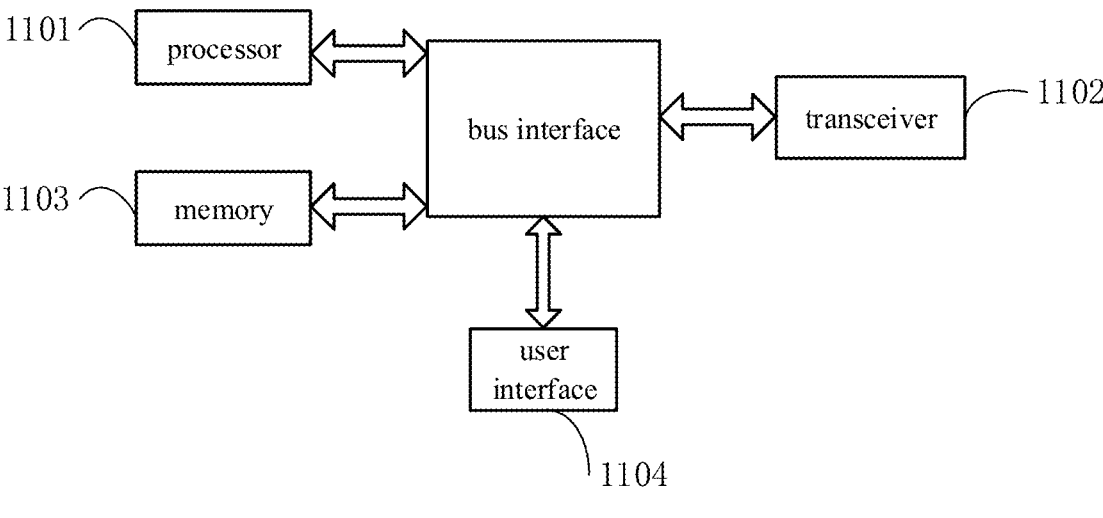
FIG. 11 is another schematic structural diagram showing a terminal according to at least one embodiment of the present disclosure.

FIG. 11 is a schematic structural diagram of a terminal provided by an embodiment of the present disclosure. The terminal includes: a processor 1101, a transceiver 1102, a memory 1103, a user interface 1104 and a bus interface.

In the embodiment of the present disclosure, the terminal further includes: a program stored in the memory 1103 and executed by the processor 1101.

When the processor 1101 executes the program to implement the following steps:

determining a target configured grant occasion (CGO) corresponding to a target Synchronization Signal and PBCH block (SSB) according to a matching relationship between the SSB and the CGO when the terminal is in a disconnected state;

sending uplink data on the target CGO.

Optionally, the processor further executes the program to implement the following steps:

determining the matching relationship between the SSB and CGO according to the configuration of the base station before the target CGO corresponding to the target SSB; or, obtaining the matching relationship between the SSB and CGO through calculation. Wherein, the matching relationship is valid in at least one matching period, and the matching period is pre-configured or pre-agreed.

Optionally, the processor further executes the program to implement the following steps:

determining the serial number of each CGO in the matching period;

according to the matching relationship between the SSB serial number and the CGO serial number, determining the serial number of the target CGO corresponding to the target SSB.

Optionally, the processor further executes the program to implement the following steps:

determining the serial number of each CGO in the matching period according to one of the following numbering rules:

numbering rule 1: numbering according to an order of a time domain first and then a frequency domain, determining the serial number of each CGO in the matching period;

numbering rule 2: numbering according to an order of the frequency domain first and then the time domain, determining the serial number of each CGO in the matching period;

numbering rule 3: in each slot in the matching period, numbering in the order of the time domain first and then the frequency domain, and numbering in a chronological order between slots in the matching period; or, in each slot in the matching period, numbering in the order of the frequency domain first and then the time domain, and numbering in the chronological order between the slots in the matching period.

Optionally, the processor further executes the program to implement the following steps:

in the case of CGOs overlapping in time domains with different starting OFDM symbols, performing numbering in an order from a nearest time to a farthest time corresponding to the starting OFDM of each CGO; in the case of CGOs overlapping in frequency domains with different starting OFDM symbols, performing numbering in an ascending order of a smallest PRB serial number in each CGO.

Optionally, the processor further executes the program to implement the following steps:

determining whether the CGO of each slot is valid according to the slot configuration before determining the serial number of each CGO in the matching period, wherein, when the slot configuration is UL, the CGO of the slot configuration is valid; when the slot configuration is DL, the CGO of the slot configuration is invalid; when the slot configuration is flexible, the CGO of the slot configuration is determined to be valid or invalid.

Optionally, the processor further executes the program to implement the following steps:

when a total number $CGO_{total}$ of CGOs in the matching period is greater than a total number $SSB_{total}$ of SSBs, calculating a value of $K_1$ according to $K_1=\lfloor CGO_{total}/SSB_{total}\rfloor$; starting from the CGO with the smallest serial number in the matching period, sequentially matching each consecutive $K_1$ CGOs with one SSB in the SSBs, or dividing the CGOs in the matching period into $K_1$ groups, each CGO group containing $SSB_{total}$ CGOs, and sequentially matching one CGO in each CGO group with the one SSB in the SSBs;

when $CGO_{total}$ is not greater than $SSB_{total}$, calculating a value of $K_2$ according to $K_2=\lfloor SSB_{total}/CGO_{total}\rfloor$; starting from the SSB with the smallest serial number, sequentially matching each $K_2$ SSBs with one CGO in the matching period, or, dividing the SSBs into $K_2$ groups, each SSB group containing $CGO_{total}$ SSBs, and sequentially matching one SSB in each SSB group with one CGO in the matching period.

Optionally, the processor further executes the program to implement the following steps:

when a matching ratio R of SSB and CGO configured by the base station is an integer greater than 1, starting from the SSB with the smallest serial number, sequentially matching every R SSBs with one CGO in the matching period, or, dividing the SSBs into R groups, and each SSB group containing the total number of CGO SSBs, and sequentially matching one SSB in each SSB group with one CGO in the matching period;

when the matching ratio R of SSB and CGO configured by the base station is not greater than 1, and 1/R is an integer, starting from the CGO with the smallest serial number in the matching period, sequentially matching each consecutive 1/R CGOs with one SSB in the SSBs, or dividing the CGOs in the matching period into 1/R groups, each CGO group containing a total number of SSB CGOs, and sequentially matching one CGO in each CGO group with one SSB in the SSBs.

Optionally, when the CG is configured as repeated transmission:

In the matching relationship, M transmission occasions TO in one CGO being used as one repetition bundle corresponding to one or more SSBs; or, N CGOs being used as one repetition bundle corresponding to one or more SSBs, wherein each of the N CGOs includes one TO, and the N is less than or equal to the maximum number of CGOs in the matching period, the serial number of the starting CGO of the repetition bundle being an integer multiple of N.

Optionally, the CGO is configured on a BWP other than the initial BWP.

Optionally, when a single user supports multiple sets of CG configurations, each set of CG configurations independently sets the matching relationship with the SSB, or multiple sets of CGs set the same matching relationship with the SSB.

It can be understood that, in the embodiment of the present disclosure, when the computer program is executed by the processor 1101, the various processes of the above-mentioned method embodiment shown in FIG. 8 can be realized, and the same technical effect can be achieved.

In FIG. 11, the bus architecture may include any number of interconnected buses and bridges, specifically various circuits of one or more processors represented by processor 1101 and memory represented by memory 1103 are linked together. The bus architecture can also link together various other circuits such as peripherals, voltage regulators, and power management circuits, etc., which are well known in the art and therefore will not be further described herein. The bus interface provides the interface. Transceiver 1102 may be a plurality of elements, including a transmitter and a receiver, providing a means for communicating with various other devices over transmission medium. For different UE, the user interface 1104 may also be an interface capable of connecting externally and internally to required devices, and the connected devices include but not limited to keypads, displays, speakers, microphones, joysticks, and so on.

The processor 1101 is responsible for managing the bus architecture and general processing, and the memory 1103 can store data used by the processor 1101 when performing operations.

It should be noted that the device in this embodiment is a device corresponding to the method shown in FIG. 8, and the implementations in the above embodiments are all applicable to this embodiment of the device, and can also achieve the same technical effect. In this device, the transceiver 1102 and the memory 1103, as well as the transceiver 1102 and the processor 1101 can be communicated and connected through the bus interface, the function of the processor 1101 can also be realized by the transceiver 1102, and the function of the transceiver 1102 can also be implemented by the processor 1101. It should be noted here that the above-mentioned device provided by the embodiments of the present disclosure can realize all the method steps in the method embodiments, and can achieve the same technical effect.

In some embodiments of the present disclosure, there is also provided a computer-readable storage medium, on which a program is stored, and when the program is executed by a processor, the following steps are implemented:

Determining, by a terminal, a target configured grant occasion (CGO) corresponding to a target Synchronization Signal and PBCH block (SSB) according to a matching relationship between the SSB and the CGO when the terminal is in a disconnected state;

Sending, by the terminal, uplink data on the target CGO.

When the program is executed by the processor, it can realize all the methods in the above-mentioned data transmission method applied to the terminal side, and can achieve the same technical effect. To avoid repetition, details are not repeated here.

Figure 12:
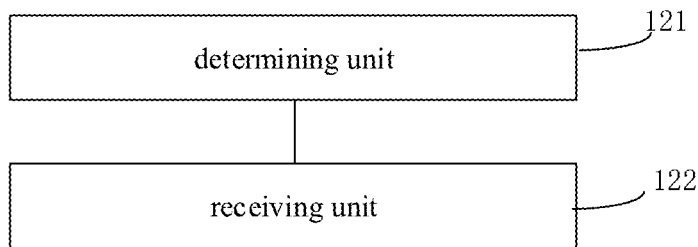
FIG. 12 is a schematic structural diagram showing a base station according to at least one embodiment of the present disclosure.

An embodiment of the present disclosure provides a base station as shown in FIG. 12, including:

a determination unit 121, configured to determine a CGO corresponding to each SSB according to a matching relationship between the SSB and the CGO;

a receiving unit 122, configured to receive data sent by the terminal in a disconnected state on the CGO corresponding to the SSB using a beam corresponding to the SSB.

Optionally, the matching relationship between the SSB and the CGO is determined by the base station according to the configuration, or is calculated by the base station, wherein the matching relationship is valid for at least one matching period, and the matching period is preconfigured or pre-agreed.

Optionally, the base station also includes:

a configuration unit, configured to send a configuration signaling to the terminal to configure the matching relationship between the SSB and the CGO.

Optionally, the determination unit 121 is further configured to determine the serial number of each CGO in the matching period; determine the serial number of the CGO corresponding to each SSB according to the matching relationship between the SSB serial number and the CGO serial number.

Optionally, the determination unit 121 is further configured to determine the serial number of each CGO in the matching period according to one of the following numbering rules:

numbering rule 1: numbering according to an order of a time domain first and then a frequency domain, determining the serial number of each CGO in the matching period;

numbering rule 2: numbering according to an order of the frequency domain first and then the time domain, determining the serial number of each CGO in the matching period;

numbering rule 3: in each slot in the matching period, numbering in the order of the time domain first and then the frequency domain, and numbering in a chronological order between slots in the matching period; or, in each slot in the matching period, numbering in the order of the frequency domain first and then the time domain, and numbering in the chronological order between the slots in the matching period.

Optionally, the determination unit 121 is further configured to, in the case of CGOs overlapping in time domains with different starting OFDM symbols, performing numbering in an order from a nearest time to a farthest time corresponding to the starting OFDM of each CGO; in the case of CGOs overlapping in frequency domains with different starting OFDM symbols, performing numbering in an ascending order of a smallest PRB serial number in each CGO.

Optionally, the determination unit 121 is further configured to determine whether the CGO of each slot is valid according to the slot configuration before determining the serial number of each CGO in the matching period, wherein, when the slot configuration is UL, the CGO of the slot configuration is valid; when the slot configuration is DL, the CGO of the slot configuration is invalid; when the slot configuration is flexible, the CGO of the slot configuration is determined to be valid or invalid.

Optionally, the matching relationship between the SSB and the CGO is calculated in the following methods:

when a total number $CGO_{total}$ of CGOs in the matching period is greater than a total number $SSB_{total}$ of SSBs, calculating a value of $K_1$ according to $K_1 = \lfloor CGO_{total} / SSB_{total} \rfloor$; starting from the CGO with the smallest serial number in the matching period, sequentially matching each consecutive $K_1$ CGOs with one SSB in the SSBs, or dividing the CGOs in the matching period into $K_1$ groups, each CGO group containing $SSB_{total}$ CGOs, and sequentially matching one CGO in each CGO group with the one SSB in the SSBs;

when $CGO_{total}$ is not greater than $SSB_{total}$, calculating a value of $K_2$ according to $K_2 = \lfloor SSB_{total}/CGO_{total} \rfloor$; starting from the SSB with the smallest serial number, sequentially matching each $K_2$ SSBs with one CGO in the matching period, or, dividing the SSBs into $K_2$ groups, each SSB group containing $CGO_{total}$ SSBs, and sequentially matching one SSB in each SSB group with one CGO in the matching period.

Optionally, the matching relationship between the SSB and the CGO is determined in the following method:

when a matching ratio R of SSB and CGO configured by the base station is an integer greater than 1, starting from the SSB with the smallest serial number, sequentially matching every R SSBs with one CGO in the matching period, or, dividing the SSBs into R groups, and each SSB group containing the total number of CGO SSBs, and sequentially matching one SSB in each SSB group with one CGO in the matching period;

when the matching ratio R of SSB and CGO configured by the base station is not greater than 1, and 1/R is an integer, starting from the CGO with the smallest serial number in the matching period, sequentially matching each consecutive 1/R CGOs with one SSB in the SSBs, or dividing the CGOs in the matching period into 1/R groups, each CGO group containing a total number of SSB CGOs, and sequentially matching one CGO in each CGO group with one SSB in the SSBs.

Optionally, when the CG is configured as repeated transmission:

In the matching relationship, M transmission occasions TO in one CGO being used as one repetition bundle corresponding to one or more SSBs; or, N CGOs being used as one repetition bundle corresponding to one or more SSBs, wherein each of the N CGOs includes one TO, and the N is less than or equal to the maximum number of CGOs in the matching period, the serial number of the starting CGO of the repetition bundle being an integer multiple of N.

Optionally, the CGO is configured on a BWP other than the initial BWP.

Optionally, when a single user supports multiple sets of CG configurations, each set of CG configurations independently sets the matching relationship with the SSB, or multiple sets of CGs set the same matching relationship with the SSB.

It should be noted that the device in this embodiment is a device corresponding to the method shown in FIG. 9, and the implementations in the above embodiments are all applicable to this embodiment of the device, and can also achieve the same technical effect. It should be noted here that the above-mentioned device provided by the embodiments of the present disclosure can realize all the method steps in the method embodiments, and can achieve the same technical effect.

Figure 13:
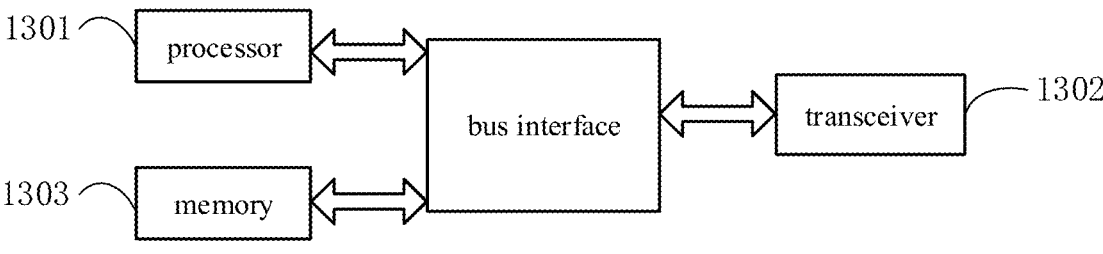
FIG. 13 is another schematic structural diagram showing a base station according to at least one embodiment of the present disclosure.

FIG. 13 is a schematic structural diagram of a base station, including: a processor 1301, a transceiver 1302, a memory 1303, and a bus interface.

In the embodiment of the present disclosure, the base station further includes: a program stored in the memory 1303 and executed by the processor 1301, when the program is executed by the processor 1301, the following steps are implemented:

determining a CGO corresponding to each SSB according to a matching relationship between the SSB and the CGO;

Receiving data sent by the terminal in a disconnected state on the CGO corresponding to the SSB using a beam corresponding to the SSB.

Optionally, the processor further executes the program to implement the following steps:

the matching relationship between the SSB and the CGO being determined by the base station according to the configuration, or being calculated by the base station, wherein the matching relationship is valid for at least one matching period, and the matching period is pre-configured or pre-agreed.

Optionally, when the processor executes the program to implement the following steps: sending a configuration signaling to the terminal to configure the matching relationship between the SSB and the CGO.

Optionally, the processor further executes the program to implement the following steps:

determining the serial number of each CGO in the matching period; determining the serial number of the CGO corresponding to each SSB according to the matching relationship between the SSB serial number and the CGO serial number.

Optionally, the processor further executes the program to implement the following steps:

determining the serial number of each CGO in the matching period according to one of the following numbering rules:

numbering rule 1: numbering according to an order of a time domain first and then a frequency domain, determining the serial number of each CGO in the matching period;

numbering rule 2: numbering according to an order of the frequency domain first and then the time domain, determining the serial number of each CGO in the matching period;

numbering rule 3: in each slot in the matching period, numbering in the order of the time domain first and then the frequency domain, and numbering in a chronological order between slots in the matching period; or, in each slot in the matching period, numbering in the order of the frequency domain first and then the time domain, and numbering in the chronological order between the slots in the matching period.

Optionally, the processor further executes the program to implement the following steps:

in the case of CGOs overlapping in time domains with different starting OFDM symbols, performing numbering in an order from a nearest time to a farthest time corresponding to the starting OFDM of each CGO; in the case of CGOs overlapping in frequency domains with different starting OFDM symbols, performing numbering in an ascending order of a smallest PRB serial number in each CGO.

Optionally, the processor further executes the program to implement the following steps:

determining whether the CGO of each slot is valid according to the slot configuration before determining the serial number of each CGO in the matching period, wherein, when the slot configuration is UL, the CGO of the slot configuration is valid; when the slot configuration is DL, the CGO of the slot configuration is invalid; when the slot configuration is flexible, the CGO of the slot configuration is determined to be valid or invalid.

Optionally, the processor further executes the program to implements the following steps:

when a total number $CGO_{total}$ of CGOs in the matching period is greater than a total number $SSB_{total}$ of SSBs, calculating a value of $K_1$ according to $K_1=\lfloor CGO_{total}/SSB_{total}\rfloor$; starting from the CGO with the smallest serial number in the matching period, sequentially matching each consecutive $K_1$ CGOs with one SSB in the SSBs, or dividing the CGOs in the matching period into $K_1$ groups, each CGO group containing $SSB_{total}$ CGOs, and sequentially matching one CGO in each CGO group with the one SSB in the SSBs;

when $CGO_{total}$ is not greater than $SSB_{total}$, calculating a value of $K_2$ according to $K_2=\lfloor SSB_{total}/CGO_{total}\rfloor$; starting from the SSB with the smallest serial number, sequentially matching each $K_2$ SSBs with one CGO in the matching period, or, dividing the SSBs into $K_2$ groups, each SSB group containing $CGO_{total}$ SSBs, and sequentially matching one SSB in each SSB group with one CGO in the matching period.

Optionally, the processor further executes the program to implement the following steps:

when a matching ratio R of SSB and CGO configured by the base station is an integer greater than 1, starting from the SSB with the smallest serial number, sequentially matching every R SSBs with one CGO in the matching period, or, dividing the SSBs into R groups, and each SSB group containing the total number of CGO SSBs, and sequentially matching one SSB in each SSB group with one CGO in the matching period;

when the matching ratio R of SSB and CGO configured by the base station is not greater than 1, and 1/R is an integer, starting from the CGO with the smallest serial number in the matching period, sequentially matching each consecutive 1/R CGOs with one SSB in the SSBs, or dividing the CGOs in the matching period into 1/R groups, each CGO group containing a total number of SSB CGOs, and sequentially matching one CGO in each CGO group with one SSB in the SSBs.

Optionally, when the CG is configured as repeated transmission:

In the matching relationship, M transmission occasions TO in one CGO being used as one repetition bundle corresponding to one or more SSBs; or, N CGOs being used as one repetition bundle corresponding to one or more SSBs, wherein each of the N CGOs includes one TO, and the N is less than or equal to the maximum number of CGOs in the matching period, the serial number of the starting CGO of the repetition bundle being an integer multiple of N.

Optionally, the CGO is configured on a BWP other than the initial BWP.

Optionally, when a single user supports multiple sets of CG configurations, each set of CG configurations independently sets the matching relationship with the SSB, or multiple sets of CGs set the same matching relationship with the SSB.

It can be understood that, in the embodiment of the present disclosure, when the computer program is executed by the processor 1301, the various processes of the above-mentioned method embodiment shown in FIG. 9 can be realized, and the same technical effect can be achieved.

In FIG. 13, the bus architecture may include any number of interconnected buses and bridges, specifically various circuits of one or more processors represented by processor 1301 and memory represented by memory 1303 are linked together. The bus architecture can also link together various other circuits such as peripherals, voltage regulators, and power management circuits, etc., which are well known in the art and therefore will not be further described herein. The bus interface provides the interface. Transceiver 1302 may be a plurality of elements, including a transmitter and a receiver, providing a means for communicating with various other devices over transmission medium.

The processor 1301 is responsible for managing the bus architecture and general processing, and the memory 1303 can store data used by the processor 1301 when performing operations.

It should be noted that the terminal in this embodiment is a device corresponding to the method shown in FIG. 9, and the implementation methods in the above embodiments are all applicable to this terminal embodiment, and can also achieve the same technical effect. In this device, the transceiver 1302 and the memory 1303, as well as the transceiver 1302 and the processor 1301 can be connected through a bus interface, the function of the processor 1301 can also be realized by the transceiver 1302, and the function of the transceiver 1302 can also be implemented by the processor 1301. It should be noted here that the above-mentioned device provided by the embodiments of the present disclosure can realize all the method steps in the method embodiments, and can achieve the same technical effect.

In some embodiments of the present disclosure, there is also provided a computer-readable storage medium, on which a program is stored, and when the program is executed by a processor, the following steps are implemented:

determining a CGO corresponding to each SSB according to a matching relationship between the SSB and the CGO;

Receiving data sent by the terminal in a disconnected state on the CGO corresponding to the SSB using a beam corresponding to the SSB.

When the program is executed by the processor, it can realize all the implementation methods in the above-mentioned data transmission method applied to the base station, and can achieve the same technical effect. In order to avoid repetition, details are not repeated here.

Those skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Those skilled in the art may implement the described functionality using different methods for each particular application, but such implementation should not be considered beyond the scope of the present disclosure.

Those skilled in the art can clearly understand that for the convenience and brevity of the description, the specific working process of the above-described system, device and unit can refer to the corresponding process in the foregoing method embodiment, which will not be repeated here.

In the embodiments provided in this application, it should be understood that the disclosed devices and methods may be implemented in other ways. For example, the device embodiments described above are only illustrative. For example, the division of the units is only a logical function division. In actual implementation, there may be other division methods. For example, multiple units or components can be combined or integrated into another system, or some features may be ignored, or not implemented. In another point, the mutual coupling or direct coupling or communication connection shown or discussed may be through some interfaces, and the indirect coupling or communication connection of devices or units may be in electrical, mechanical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the solutions of the embodiments of the present disclosure.

In addition, each functional unit in each embodiment of the present disclosure may be integrated into one processing unit, each unit may exist separately physically, or two or more units may be integrated into one unit.

If the functions described above are realized in the form of software function units and sold or used as independent products, they can be stored in a computer-readable storage medium. Based on this understanding, the essence of the technical solution of the present disclosure or the part that contributes to the related technology can be embodied in the form of a software product. The computer software product is stored in a storage medium, including several instructions used to make a computer device (which may be a personal computer, a server, or a network device, etc.) execute all or part of the steps of the methods described in various embodiments of the present disclosure. The aforementioned storage medium includes: various media capable of storing program codes such as U disk, mobile hard disk, ROM, RAM, magnetic disk or optical disk.

It should be noted that it should be understood that the division of the above modules is only a division of logical functions, and may be fully or partially integrated into a physical entity or physically separated during actual implementation. And these modules can all be implemented in the form of calling software through processing elements; they can also be implemented in the form of hardware; some modules can also be implemented in the form of calling software through processing elements, and some modules can be implemented in the form of hardware. For example, the determining module may be a separate processing element, or may be integrated in a chip of the above-mentioned device. In addition, it may be stored in the memory of the above-mentioned device in the form of program code, and a certain processing element of the above-mentioned device may call and execute the functions of the modules identified above. The implementation of other modules is similar. In addition, all or part of these modules can be integrated together, and can also be implemented independently. The processing element mentioned here may be an integrated circuit with signal processing capability. In the implementation process, each step of the above method or each module above can be completed by an integrated logic circuit of hardware in the processor element or an instruction in the form of software.

For example, each module, unit, subunit or submodule may be one or more integrated circuits configured to implement the above method, for example: one or more specific integrated circuits (Application Specific Integrated Circuit, ASIC), or, one or Multiple microprocessors (digital signal processor, DSP), or, one or more field programmable gate arrays (FPGA), etc. For another example, when one of the above modules is implemented in the form of a processing element scheduling program code, the processing element may be a general-purpose processor, such as a central processing unit (CPU) or other processors that can call program codes. For another example, these modules can be integrated together and implemented in the form of a system-on-a-chip (SOC).

The terms "first", "second" and the like in the specification and claims of the present disclosure are used to distinguish similar objects, and are not necessarily used to describe a specific order or sequence. It should be understood that the data so used may be interchanged under appropriate circumstances such that the embodiments of the disclosure described herein are practiced, for example, in sequences other than those illustrated or described herein. Furthermore, the terms "comprising" and "having", as well as any variations thereof, are intended to cover a non-exclusive inclusion, for example, a process, method, system, product or device comprising a sequence of steps or elements is not necessarily limited to the expressly listed instead, may include other steps or elements not explicitly listed or inherent to the process, method, product or apparatus. In addition, the use of "and/or" in the description and claims means at least one of the connected objects, such as A and/or B and/or C, means that it includes A alone, B alone, C alone, and both A and B, both B and C, both A and C, and A, B, and C all exist, there are 7 situations. Similarly, the use of "at least one of A or B" in the present disclosure and claims should be understood as "A alone, B alone, or both A and B".

Obviously, those skilled in the art can make various changes and modifications to the present disclosure without departing from the spirit and scope of the present disclosure. In this way, if these change and modifications fall in the scope of the claims of the present disclosure and their equivalence, the present disclosure is also intended to include these change and modifications.

What is claimed is:

1. A data transmission method, comprising:

determining, by a terminal in a disconnected state, a target configured grant occasion (CGO) corresponding to a target Synchronization Signal and PBCH block (SSB) according to a matching relationship between the SSB and the CGO;

sending, by the terminal, uplink data on the target CGO, wherein, before determining a target CGO corresponding to a target SSB, the method further comprises:

determining, by the terminal, the matching relationship between the SSB and CGO according to configuration of a base station; or, obtaining, by the terminal, the matching relationship between the SSB and CGO through calculation, wherein the matching relationship is valid in at least one matching period, and the matching period is preconfigured or pre-agreed; and wherein, when the CG is configured as repeated transmission:

in the matching relationship, M transmission occasions TO in one CGO being used as one repetition bundle corresponding to one or more SSBs; or, N CGOs being used as one repetition bundle corresponding to one or more SSBs, wherein each of the N CGOs includes one TO, and the N is less than or equal to the maximum number of CGOs in the matching period, a serial number of a starting CGO of the repetition bundle being an integer multiple of N.

2. The method according to claim 1, wherein the determining a target CGO corresponding to a target SSB comprises:

determining a serial number of each CGO in the matching period;

determining a serial number of the target CGO corresponding to the target SSB according to a matching relationship between an SSB serial number and a CGO serial number.

3. The method according to claim 2, wherein determining a serial number of each CGO in the matching period comprises:

determining the serial number of each CGO in the matching period according to one of the following numbering rules:

numbering rule 1: numbering according to an order of a time domain first and then a frequency domain, determining the serial number of each CGO in the matching period;

numbering rule 2: numbering according to an order of the frequency domain first and then the time domain, determining the serial number of each CGO in the matching period;

numbering rule 3: in each slot in the matching period, numbering in the order of the time domain first and then the frequency domain, and numbering in a chronological order between slots in the matching period; or, in each slot in the matching period, numbering in the order of the frequency domain first and then the time domain, and numbering in the chronological order between the slots in the matching period.

4. The method according to claim 3, wherein the determining the serial number of each CGO in the matching period further comprises:

in the case of CGOs overlapping in time domains with different starting OFDM symbols, performing numbering in an order from a nearest time to a farthest time corresponding to the starting OFDM of each CGO; in the case of CGOs overlapping in frequency domains with different starting OFDM symbols, performing numbering in an ascending order of a smallest PRB serial number in each CGO.

5. The method according to claim 4, wherein, before determining the serial number of each CGO in the matching period, the method further comprises:

determining whether the CGO of each slot is valid according to a slot configuration, wherein, when the slot configuration is UL, a CGO of the slot configuration is valid; when the slot configuration is DL, the CGO of the slot configuration is invalid; when the slot configuration is flexible, the CGO of the slot configuration is determined to be valid or invalid.

6. The method according to claim 1, wherein the obtaining, by the terminal, the matching relationship between the SSB and the CGO through calculation, comprises:

when a total number $CGO_{total}$ of CGOs in the matching period is greater than a total number $SSB_{total}$ of SSBs, calculating a value of $K_1$ according to $$K_1 = \lfloor CGO_{total} / SSB_{total} \rfloor;$$

starting from the CGO with the smallest serial number in the matching period, sequentially matching each consecutive $K_1$ CGOs with one SSB in the SSBs, or dividing the CGOs in the matching period into $K_1$ groups, each CGO group containing $SSB_{total}$ CGOs, and sequentially matching one CGO in each CGO group with the one SSB in the SSBs;

when $CGO_{total}$ is not greater than $SSB_{total}$, calculating a value of $K_2$ according to $$K_2 = \lfloor SSB_{total} / CGO_{total} \rfloor;$$

starting from the SSB with the smallest serial number, sequentially matching each $K_2$ SSBs with one CGO in the matching period, or, dividing the SSBs into $K_2$ groups, each SSB group containing $CGO_{total}$ SSBs, and sequentially matching one SSB in each SSB group with one CGO in the matching period.

7. The method according to claim 1, wherein the determining, by the terminal, the matching relationship between the SSB and the CGO according to configuration of the base station, comprises:

when a matching ratio R of SSB and CGO configured by the base station is an integer greater than 1, starting from the SSB with the smallest serial number, sequentially matching every R SSBs with one CGO in the matching period, or, dividing the SSBs into R groups, and each SSB group containing the total number of CGO SSBs, and sequentially matching one SSB in each SSB group with one CGO in the matching period;

when the matching ratio R of SSB and CGO configured by the base station is not greater than 1, and 1/R is an integer, starting from the CGO with the smallest serial number in the matching period, sequentially matching each consecutive 1/R CGOs with one SSB in the SSBs, or dividing the CGOs in the matching period into 1/R groups, each CGO group containing a total number of SSB CGOs, and sequentially matching one CGO in each CGO group with one SSB in the SSBs.

8. The method according to claim 1, wherein the CGO is configured on a BWP other than an initial BWP.

9. The method according to claim 1, wherein when a single user supports multiple sets of CG configurations, each set of CG configurations independently sets the matching relationship with the SSB, or multiple sets of CGs set a same matching relationship with the SSB.

10. A data transmission method, comprising:

determining, by a base station, a CGO corresponding to each SSB according to a matching relationship between the SSB and the CGO;

receiving, by the base station, data sent by a terminal in a disconnected state on the CGO corresponding to the SSB using a beam corresponding to the SSB, wherein the matching relationship between the SSB and the CGO is determined by the base station according to configuration, or is obtained by the base station through calculation, wherein the matching relationship is valid in at least one matching period, and the matching period is preconfigured or pre-agreed; and wherein, when the CG is configured as repeated transmission:

in the matching relationship, M transmission occasions TO in one CGO being used as one repetition bundle corresponding to one or more SSBs; or, N CGOs being used as one repetition bundle corresponding to one or more SSBs, wherein each of the N CGOs includes one TO, and the N is less than or equal to the maximum number of CGOs in the matching period, a serial number of a starting CGO of the repetition bundle being an integer multiple of N.

11. The method according to claim 10, further comprising:

sending a configuration signaling to the terminal to configure the matching relationship between the SSB and the CGO.

12. The method according to claim 10, wherein the determining the CGO corresponding to each SSB comprises:
   determining a serial number of each CGO in the matching period;
   determining a serial number of a CGO corresponding to each SSB according to a matching relationship between a SSB serial number and a CGO serial number.

13. The method according to claim 12, wherein the determining the serial number of each CGO in the matching period comprises:
   determining the serial number of each CGO in the matching period according to one of the following numbering rules:
      numbering rule 1: numbering according to an order of a time domain first and then a frequency domain, determining the serial number of each CGO in the matching period;
      numbering rule 2: numbering according to an order of the frequency domain first and then the time domain, determining the serial number of each CGO in the matching period;
      numbering rule 3: in each slot in the matching period, numbering in the order of the time domain first and then the frequency domain, and numbering in a chronological order between slots in the matching period; or, in each slot in the matching period, numbering in the order of the frequency domain first and then the time domain, and numbering in the chronological order between the slots in the matching period.

14. The method according to claim 13, wherein the determining the serial number of each CGO in the matching period further comprises:
   in the case of CGOs overlapping in time domains with different starting OFDM symbols, performing numbering in an order from a nearest time to a farthest time corresponding to the starting OFDM of each CGO; in the case of CGOs overlapping in frequency domains with different starting OFDM symbols, performing numbering in an ascending order of a smallest PRB serial number in each CGO.

15. The method according to claim 14, wherein, before determining the serial number of each CGO in the matching period, the method further comprises:
   determining whether the CGO of each slot is valid according to a slot configuration, wherein, when the slot configuration is UL, a CGO of the slot configuration is valid; when the slot configuration is DL, the CGO of the slot configuration is invalid; when the slot configuration is flexible, the CGO of the slot configuration is determined to be valid or invalid.

16. A terminal, comprising a memory, a transceiver and a processor, wherein,
   the memory is used to store computer programs;
   the transceiver is used to send and receive data under the control of the processor;
   the processor is configured to read the computer program in the memory and perform the following operations:
   when the terminal is in a disconnected state, determining a target configured grant occasion (CGO) corresponding to a target Synchronization Signal and PBCH block (SSB) according to a matching relationship between the SSB and the CGO;
   sending uplink data on the target CGO,
   wherein the processor is further configured to read the computer program in the memory and perform the following operations:
   before determining a target CGO corresponding to a target SSB:
   determining, by the terminal, the matching relationship between the SSB and CGO according to configuration of a base station; or,
   obtaining, by the terminal, the matching relationship between the SSB and CGO through calculation,
   wherein the matching relationship is valid in at least one matching period, and the matching period is preconfigured or pre-agreed; and
   wherein, when the CG is configured as repeated transmission:
   in the matching relationship, M transmission occasions TO in one CGO being used as one repetition bundle corresponding to one or more SSBs; or,
   N CGOs being used as one repetition bundle corresponding to one or more SSBs, wherein each of the N CGOs includes one TO, and the N is less than or equal to the maximum number of CGOs in the matching period, a serial number of a starting CGO of the repetition bundle being an integer multiple of N.

17. A base station, comprising a memory, a transceiver, and a processor, wherein,
   the memory is used to store computer programs;
   the transceiver is used to send and receive data under the control of the processor;
   the processor is configured to read the computer program in the memory and perform the data transmission method according to claim 10.

* * * * *